(12) United States Patent
Barral

(10) Patent No.: US 6,470,301 B1
(45) Date of Patent: Oct. 22, 2002

(54) OPTIMIZATION TOOL FOR ASSEMBLY WORKCELL LAYOUT

(75) Inventor: David Barral, Rueil Malmaison (FR)

(73) Assignee: Dassault Systemes, Suresnes (FR)

( * ) Notice: Subject to any disclaimer, the term of this patent is extended or adjusted under 35 U.S.C. 154(b) by 0 days.

(21) Appl. No.: 09/448,776

(22) Filed: Nov. 24, 1999

Related U.S. Application Data

(63) Continuation-in-part of application No. 09/414,618, filed on Oct. 8, 1999.

(51) Int. Cl.$^7$ .......................... G06F 17/10; G06F 7/60; G06G 7/48
(52) U.S. Cl. ...................... 703/1; 703/2; 703/6; 703/7
(58) Field of Search ........................... 395/94, 89, 86, 395/23; 700/108, 99, 96, 101, 249, 165, 145; 382/173; 703/2, 6, 7, 1

(56) References Cited

U.S. PATENT DOCUMENTS

| | | | | |
|---|---|---|---|---|
| 5,748,847 A | * | 5/1998 | Lo | 395/23 |
| 6,031,935 A | * | 2/2000 | Kimmel | 382/173 |
| 6,395,478 B1 | * | 5/2002 | Nandabalan et al. | 435/6 |

OTHER PUBLICATIONS

Lee et al., "Collision free path planning with neural networks", IEEE International Conference on Robotics and Automation, Apr. 1997.*

Martinez–Alfaro et al., "Collision free path planning for mobile robots and/or AGVs using simulated annealing", IEEE International Conference on System, man and Cybernetics, Oct. 1994.*

Lee et al., "Geometric Collision detection and potential field based Time delay planning for dual arm systems", IEEE International conference on Robotics and Automation, Apr. 1997.*

Shiller, "Interactive time optimal robot motion planning and workcell layout design", IEEE International conference on Robotics and automation, May 1989.*

Freund et al., "Towards realistic simulation of robotic workcells", IEEE International conference on Intelligent Robots and systems, Sep. 1994.*

Rutenbar, "Simulated annealing algorithms: an overview", IEEE Circuits and devices magazine, Jan. 1989.*

Lueth, "Automated Planning of robot workcell layouts", Proceedings of the 1992 IEEE International Conference on Robotics and Automation, May 1992.*

M.L. Tay et al., "Optimising Robot Workcell Layout", *Advanced Manufacturing Technology*, 1996, pp. 377–385.

V. Scheinman et al., "On the Optimal Selection and Placement of Manipulators", *Theory and Practice of Robots and Manipulators*, 1985, pp. 39–45.

(List continued on next page.)

*Primary Examiner*—Hugh M. Jones
*Assistant Examiner*—Kandasamy Thangavelu
(74) *Attorney, Agent, or Firm*—Victor J. Geraci; Clifford Chance Rogers & Wells LLP

(57) ABSTRACT

A method and system for optimizing the assembly workcell layout in the context of industrial robotic CAD/CAM/CAE software products. The criterion to be minimized is the cycle time for completing a given sequence of operations, which is achieved by determining the relative positions of peripheral machines on the workcell floor. The method is constructive: each machine is placed one at a time in the robot neighborhood, by means of a modified simulated annealing method. This method yields several possible and optimal positions for a machine and several layouts are thus obtained at the end of execution.

13 Claims, 22 Drawing Sheets

OTHER PUBLICATIONS

B. Paden et al., "Optimal Kinematic Design of 6R Manipulators", *The International Journal of Robotics Research*, Mar./Apr. 1988, vol. 7, No. 2, pp. 43–61.

G. Sahar et al., "Planning of Minimum–Time Trajectories for Robot Arms", *The International Journal of Robotics Research*, Fall 1986, vol. 5, No. 3, pp. 90–100.

O. Ma et al., "The Concept of Dynamic Isotropy and Its Applications to Inverse Kinematics and Trajectory Planning", *1990 IEEE International Conference on Robotics and Automation*, May 13–18, 1990, pp. 481–486.

B. Nelson et al., "Optimizing the Location of Assembly Tasks in a Manipulator's Workplace", *Journal of Robotic Systems*, Dec. 1990, vol. 7, No. 6, pp. 791–811.

A. Hemami et al., "A Case Study of Two–Robot–Arm Workcell Material Handling", *Journal of Robotic Systems*, 1991, vol. 8, No. 1, pp. 21–37.

P. Borrel et al., "A Study of Multiple Manipulator Inverse Kinematic Solutions with Applications to Trajectory Planning and Workspace Determination", *1986 IEEE International Conference on Robotics and Automation*, Apr. 7–10, 1986, vol. 2, pp. 1180–1186.

F. Park, "On The Optimal Kinematic Design of Spherical and Spatial Mechanisms", *1991 IEEE International Conference on Robotics and Automation*, Apr. 9–11, 1991, pp. 1530–1535.

T. Lueth, "Automated Planning of Robot Workcell Layouts", *1992 IEEE International Conference on Robotics and Automation*, May 12–14, 1992, pp. 1103–1108.

Y. Edan et al., "Near–Minimum–Time Task Planning for Fruit–Picking Robots", *IEEE Transactions on Robotics and Automation*, Feb. 1991, vol. 7, No. 1, pp. 48–56.

J.A. Pamanes et al., "Optimal Placement of Robotic Manipulators Using Multiple Kinematic Criteria", *1991 IEEE International Conference on Robotics and Automation*, Apr. 9–11, 1991, pp. 933–938.

B. Fardanesh et al., "Minimum Cycle Time Location of a Task in the Workspace of a Robot Arm", $27^{th}$ *IEEE Conference on Decision and Control*, Dec. 7–9, 1998, vol. 3 of 3, pp. 2280–2283.

B. Nelson et al., "Locating Assembly Tasks in a Manipulator's Workspace", *1987 IEEE International Conference on Robotics and Automation*, Mar. 31–Apr. 3, 1987, vol. 3, pp. 1367–1372.

B. Faverjon et al., "The Mixed Approach for Motion Planning: Learning Global Strategies from a Local Planner", *International Joint Conferences on Artificial Intelligence, Inc.*, Aug. 23–28, 1987, pp. 1131–1137.

J. Hemmerle et al., "Optimal Path Placement for Kinematically Redundant Manipulators", *1991 IEEE International Conference on Robotics and Automation*, Apr. 9–11, 1991, pp. 1234–1244.

J. Borenstein et al., "Task–Level Tour Plan Generation for Mobile Robots", *IEEE Transactions on Systems, Man, and Cybernetics*, Aug. 1990, vol. 20, No. 4, pp. 938–943.

H. Geering et al., "Time–Optimal Motions of Robots in Assembly Tasks", $24^{th}$ *IEEE Conference on Decision & Control*, Dec. 11–13, 1998, vol. 2 of 3, pp. 982–989.

S. Dubowsky et al., "Planning Time–Optimal Robotic Manipulator Motions and Work Place for Point–to–Point Tasks", *IEEE Transactions on Robotics and Automation*, Jun. 1989, vol. 5, No. 3, pp. 377–381.

P. Wenger et al., "Ability of a Robot to Travel Through its Free Work Space in an Environment with Obstacles", *The International Journal of Robotics Research*, Jun. 1991, vol. 10, No. 3, pp. 214–227.

S. Manoochehri et al., "A Computer–Based Methodology for the Form Synthesis and Optimal Design of Robot Manipulators", *Journal of Mechanical Design*, Dec. 1990, vol. 112, pp. 501–508.

S. Kirkpatrick et al., "Optimization by Simulated Annealing", *Science*, May 13, 1983, vol., 220, No. 4598, pp. 671–680.

N. Metropolis et al., "Equation of State Calculations by Fast Computing Machines", *The Journal of Chemical Physics*, Jun. 1953, vol. 21, No. 6, pp. 1087–1092.

S. Chiu, "Task Compatibility of Manipulator Postures", *The International Journal of Robotics Research*, Oct. 1988, vol. 7, No. 5, pp. 13–21.

R. Chang et al., "VLSI Circuit Placement with Rectilinear Modules using Three–Layer Force–Directed Self–Organizing Maps", *IEEE Transactions on Neural Networks*, Sep. 1997, vol. 8, No. 5, pp. 1049–1064.

K. Tam, "Genetic Algorithms, Function Optimization, and Facility Layout Design", *European Journal of Operational Research*, Dec. 10, 1992, vol. 63, No. 2, pp. 322–346.

A. Kusiak et al., "The Facility Layout Problem", *European Journal of Operational Research*, Jun. 1987, vol. 29, No. 3, pp. 229–251.

S. Sahni et al., "P–Complete Approximation Problems", *Journal of the Association for Computing Machinery*, Jul. 1976, vol. 23, No. 3, pp. 555–565.

S. Chittajalu et al., "Layout Design for Robotic Assembly Workcells", *Tehnical Paper SME, A086 409*, Apr. 20–24, 1986, pp. 7–59, 7–61 through 7–69.

K. Kado et al., "A Study of Genetic Algorithm Hybrids for Facility Layout Problems", *Proceedings of the International Conference on Genetic Algorithms*, 1995, pp. 498–505.

A. Smith et al., "Genetic Optimazation Using a Penalty Function", *Proceeding of the Fifth International Conference on Genetic Algorithms*, Jul. 17–21, 1993, pp. 499–505.

C. Sechen, "Chip–Planning, Placement, and the Global Routing of Macro/Custom Cell Integrated Circuits Using Simulated Annealing", $25^{th}$ *ACM/IEEE Design Automation Conference*, Jun. 12–15, 1988, Paper 5.4, pp. 73 80.

Y. Kim et al., "Stepwise–Overlapped Parallel Annealing and it's Application to Floorplan Designs", *Computer–Aided Design*, Mar. 2, 1991, vol. 23, No. 2, pp. 133–144.

B. Ngoi et al., "A Fast Spatial Representation Method (Applied to Fixture Design)", *Advanced Manufacturing Technology*, 1993, vol. 8, No. 2, pp. 71–77.

J. Cagan et al., "A Simulated Annealing–Based Algorithm Using Hierachical Models for General Three–Dimensional Component Layout", *Computer–Aided Design*, Sep. 1, 1998, vol. 30, No. 10, pp. 781–790.

M. Bazaraa et al., "A Branch–and–Bound–Based Heuristic for Solving the Quadratic Assignment Problme*", *Naval Research Logistics Quarterly*, Jun. 1983, vol. 30, No. 2, pp. 287–304.

K. Tam, "A Simulated Annealing Algorithm for Allocating Space to Manufacturing Cells", *International Journal of Product Research*, 1992, vol. 30, No. 1, pp. 63–87.

M. Scriabin et al., "A Cluster–Analytic Approach to Facility Layout", *Management Science*, Jan. 1985, vol. 31, No. 1, pp. 33–49.

R. Burkard et al., "Numerical Investigations on Quadratic Assignment Problems", *Naval Research Logistics Quarterly*, Mar. 1978, vol. 25, No. 1, pp. 129–148.

Z. Drezner et al., "On Optimizing Bin Picking and Insertion Plans for Assembly Robots", *IIE Transactions*, Sep. 1984, vol. 16, No. 3, pp. 262–270.

P. Chedmail et al., "Design and Positioning of a Robot in an Environment with Obstacles using Optimal Research", *1989 IEEE International Conference on Robotics and Automation*, vol. 2, pp. 1069–1074.

D. Barral et al., "Development of Optimisation Tools in the Context of an Industrial Robotic CAD Software Product", *International Journal of Advanced Manufacturing Technology*, Aug. 31, 1999, vol. 15, Issue 11, pp. 822–831.

D. Barral et al., "Simulated Annealing Combined with a Constructive Algorithm for Optimising Assembly Workcell Layout", *Advanced Manufacturing Technology*, 2001, vol. 17, pp. 593–602.

D. Barral et al., "An Evolutionary Simulated Annealing Algorithm for Optimizing Robotic Task Point Ordering", *1999 IEEE International Symposium on Assembly and Task Planning*, Jul. 1999, pp. 157–162.

C. Zhao et al., "Collision–Free Path Planning for a Robot with Two Arms Cooperating in the 3–D Work Space", *1996 IEEE International Conference on Robotics and Automation*, Apr. 22, 1996, pp. 2835–2840.

B. Faverjon, "A Practical Approach to Motion–Planning for Manipulators with Many Degrees of Freedom", *Robotic Research, International Symposium*, Aug. 28, 1989, pp. 425–433.

U. Roβgoderer et al., "A Concept for Automated Layout Generation", *IEEE International Conference on Robotics and Automation*, May 21, 1995, pp. 800–805.

C. Sechen, "VLSI Placement and Global Routing Using Simulated Annealing", 1988, pp. 1–278.

J. Doulcier, "Implantation optimale d'un robot en fonctin d'une tache a realiser en environment contraint", *Ecole Nationale des Ponts et Chaussees*, Jan. 14, 1993, pp. 21–262, French.

European Search Report for EP 00 40 3243, Oct. 3, 2001.

* cited by examiner

| MACHINE NO. | 1 | 2 | 3 |
|---|---|---|---|
| 1 | 2 | 3 | 0 |
| 2 | 3 | 3 | 3 |
| 3 | 0 | 3 | 2 |

FIG. 5

| Machine no. | 1 | 2 | 3 | 4 | 5 |
|---|---|---|---|---|---|
| Size | 129600 | 6400 | 37050 | 6400 | 7550 |
| Normalised Size | .035 | .719 | .124 | .719 | .609 |
| Machine no. | 6 | 7 | 8 | 9 | 10 |
| Size | 11500 | 4600 | 11500 | 16100 | 29700 |
| Normalised Size | .400 | 1.000 | .400 | .286 | .154 |

FIG. 20

| No. | 1 | 2 | 3 | 4 | 5 | 6 | 7 | 8 | 9 | 10 |
|---|---|---|---|---|---|---|---|---|---|---|
| 1 | 49 | 3 | 12 | 12 | 12 | 11 | 12 | 11 | 12 | 11 |
| 2 | 3 | 2 | 0 | 0 | 0 | 0 | 0 | 1 | 0 | 0 |
| 3 | 12 | 0 | 6 | 0 | 0 | 0 | 0 | 0 | 0 | 0 |
| 4 | 12 | 0 | 0 | 6 | 0 | 0 | 0 | 0 | 0 | 0 |
| 5 | 12 | 0 | 0 | 0 | 6 | 0 | 0 | 0 | 0 | 0 |
| 6 | 11 | 0 | 0 | 0 | 0 | 6 | 0 | 0 | 0 | 0 |
| 7 | 12 | 0 | 0 | 0 | 0 | 0 | 6 | 0 | 0 | 0 |
| 8 | 11 | 1 | 0 | 0 | 0 | 0 | 0 | 6 | 0 | 0 |
| 9 | 12 | 0 | 0 | 0 | 0 | 0 | 0 | 0 | 6 | 0 |
| 10 | 11 | 0 | 0 | 0 | 0 | 0 | 0 | 0 | 0 | 6 |

FIG. 21

OPTIMIZATION TOOL FOR ASSEMBLY WORKCELL LAYOUT

This application is a continuation-in-part of application Ser. No. 09/414,618, filed Oct. 8, 1999.

BACKGROUND

The present invention relates to computer software utility programs, and more specifically to programs in the field of computer aided design (CAD), computer aided manufacturing (CAM), and computer aided engineering (CAE), and in particular the use of such systems for determining the proper physical location of robots and machines in a manufacturing facility.

Robots are used extensively in automated manufacturing processes. Robots can be employed to perform repetitive tasks in a precise and time efficient manner. For example, robots are employed in automobile production lines to apply spot welds to automobile frames, resulting in more precise placement of welds, in a more time efficient manner, than can be accomplished through the use of manual labor. As another example, a robot, located in a workcell and surrounded by other machines, obtains parts from the various peripheral machines in the workcell environment and creates a product by assembling the various parts at a workstation. In a typical manufacturing process, a robot performs a repetitive sequence of point-to-point movements, coming to a stop at each point. For example, the robot will apply a spot weld to an assembly at each programmed stop location. As another example, in an assembly operation, a robot will move from one peripheral machine to the next in an operation sequence dictated by the assembly task being performed.

The productivity of a robot can be improved considerably by minimizing the cycle time for completing an operation sequence. For a given robot, cycle time depends on many parameters, such as the position of the manipulator tool of the robot relative to the task, the sequence in which the points are visited, the maximum velocities and accelerations of the actuators, the relative position of the points, and the configuration of the robotic arm. It also depends on the relative position of the points that the robot will access, and thus on workcell layout. A robot ill-placed at its workstation risks inefficient operation and even failure. Thus, there is a need for a system for choosing robot and peripheral machine positions so that cycle time can be minimized for a specified operation sequence.

Existing CAD systems can be used to model a manufacturing facility including robots. Such CAD systems, when equipped with data detailing the configuration of the robots, and configuration of peripheral equipment in the workcell, are used to model the workplace. Each item can be placed within the workcell for the purpose of modeling the facility, and peripheral machines can then be moved to check for task feasibility and efficiency. However, the design process used so far in industry for designing robot workcells contains some interactive check and change loops that must be performed by the user. Such a process is time-consuming and the quality of the layout depends heavily on the human designer. To come to an integrated design process for workcells, an automatic layout planning tool for optimizing robot and peripheral machine position to achieve a low cycle time is required in CAD/CAM/CAE systems.

SUMMARY OF THE INVENTION

Accordingly, the present invention provides a system, method and apparatus for finding, in an efficient manner, the optimal or near-optimal layout of a robotic assembly workcell that consists of a robot and peripheral machines. Optimal layout is defined as the placement of a robot and peripheral machines in the workcell (workspace) that will allow the operation sequence to proceed in a minimum amount of time.

The present invention employs a "constructive algorithm" technique which consists of setting up step-by-step subsets of variables until a complete solution is obtained. The items to be placed in the workcell are, of course, the robot and each of the peripheral machines involved in the operation. According to an aspect of the invention, the workcell layout problem is attacked by first placing a robot and a first peripheral machine within a workcell. A second peripheral machine is then selected for placement in the workcell. According to an aspect of the invention, a modified "simulated annealing" method is employed to find a set of locations on the floor of the workcell in which the second peripheral machine may be placed. The modified simulated annealing method finds locations that would result in a minimum amount of time for interaction between the robot and the peripheral machines in the workcell (cycle time).

The modified simulated annealing method of the present invention yields a set of placements for the second peripheral machine which are near optimal. That is, none of the locations found in the search is necessarily the absolute optimum (although one of solutions may be the absolute optimum). Nevertheless, the locations found by the method represent near optimum locations for placement of the peripheral machine. According to the invention, although the modified simulated annealing method may generate many possible placements, only the best locations (in terms of cycle time) are kept for further evaluation. The remainder of the locations generated by the simulated annealing method are removed from consideration. According to a preferred embodiment of the invention, only the five best locations are selected. Thus, the partial layout set for further evaluation would consist of five partial layouts, each of which would have the robot and the first machine in their original locations, and the second peripheral machine at a specific location on the workcell floor.

The modified simulated annealing method is performed for each of the kept partial layouts when a new machine is added. Thus, according to an aspect of the invention, a third peripheral machine is chosen for placement. Each of the partial layouts in the partial layout set is then searched using the modified simulated annealing method of the present invention to find a set of possible placements for the third peripheral machine. For each of the five kept partial layouts, the search process yields set of new partial layouts containing the robot, the first two peripheral machines, and the third machine. Since the search is conducted for each of the five kept partial layouts, a large number of layouts containing the third peripheral machine are generated. However, according to an aspect of the invention, again, only the best partial layouts are selected for further evaluation, and the remainder are removed from consideration. According to the preferred embodiment of the invention, only the five best partial layouts are selected, although is to be understood that any number of partial layouts may be selected, as desired by the user or dictated by the availability of CPU time.

The foregoing process is repeated until all of the peripheral machines have been placed in the workcell environment.

According to another aspect of the invention, the first peripheral machine is placed in the center of an "acceptable base location domain". Because of the kinematic limitations of the arm and wrist joints of a robot, the manipulator tool of a robot can only reach a limited amount of discrete locations in its environment for any single robot base location. Likewise, if the manipulator tool of the robot is fixed in one location and the robot base is allowed to move, moving the robot arm and wrist through its operating range will move the base of the robot around the floor of the workcell. The area on the workcell floor in which the robot base travels when the robot is moved through its entire operating range defines the acceptable base location domain of the robot for a particular work point. Placing the robot outside the acceptable base location domain will not allow the robot to reach the work point.

According to another aspect of the invention, the order in which the peripheral machines are evaluated is determined by use of a machine selection rule, which favors as a first criterion machines that are accessed most during the operation sequence, and favors as a second criterion small machines. This results in an improved optimization of cycle time.

According to another aspect of the invention, the shapes of peripheral machines are simplified prior to the application of the simulated annealing method. This results in speeding the process time for the search.

As stated, a modified "simulated annealing" method is employed to find a set of optimal positions for peripheral machine placement for minimum cycle time. The classic simulated annealing algorithm will be familiar to a person of skill in the art, and is described, for example, at S. Kirkpatrick, C. D. Gelatt, Jr. and M. P. Vecchi, "Optimization by Simulated Annealing", *Science*, 220 (4598), pp. 671–680, May 1983, which is incorporated herein by reference. The conventional simulated annealing algorithm can only yield a single and isolated optimal solution to the problem, which is not satisfactory in the context of an industrial CAD system. Furthermore, simulated annealing may require long computation times, as it cannot distinguish a local minimum from an ordinary solution, unless it visits the very bottom of the local minimum. According to the invention, two features were added to the conventional simulated annealing method to build some "opportunism" into the method.

The first feature is the use of what has been termed a "freeze-heat" cycle, which corresponds to regular application of local search procedures. This feature is aimed at exploring a minimum valley as fast as possible and yields the closest local minimum in the search space. The second feature is the memorization of the local minima and their "attraction areas". In this way a minimum valley is not revisited once it has been explored, and other minima can be obtained. Such modifications yield a set of near-optimal solutions at the end of execution, together with the knowledge of their respective neighborhoods. Using this modification, there is no guarantee that the single absolute optimal location for the robot base will be found. Instead, a set of near-optimal solutions will be obtained, using substantially less computational resources than would be necessary using a classic simulated annealing method.

BRIEF DESCRIPTION OF THE DRAWINGS

FIG. 5 is a sample rank table, according to the preferred embodiment of the invention, for organizing and storing the number of times a particular machine is accessed by a robot, and the number of interactions between machines for a given operation sequence.

FIG. 20 is an illustration of a machine size table generated by the preferred embodiment of the invention, for the example workcell presented herein.

FIG. 21 is an illustration of the rank table generated by the preferred embodiment of the invention, for the example presented herein.

DETAILED DESCRIPTION OF THE INVENTION

Figure 1:
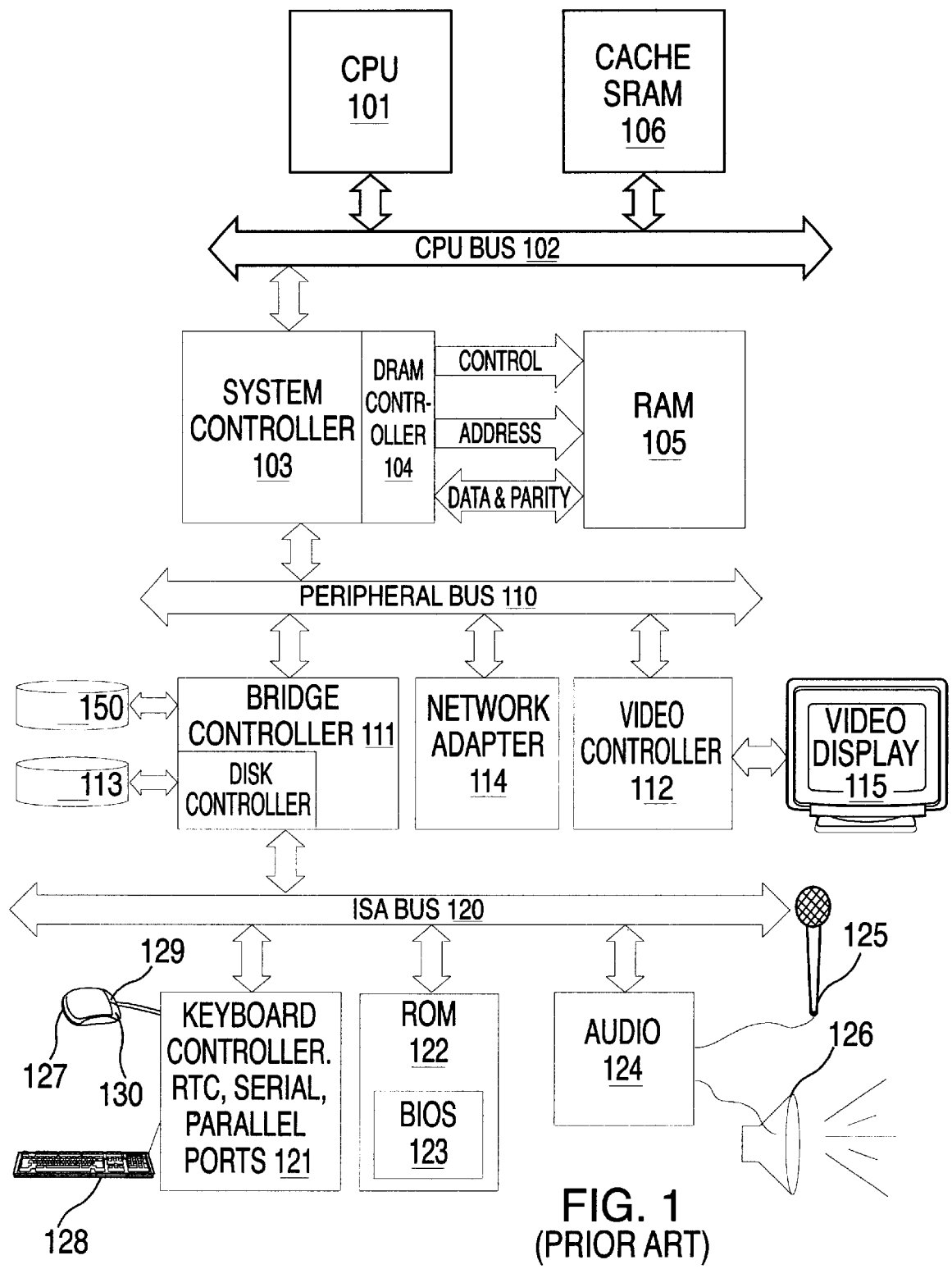
FIG. 1 is a block diagram of a computer system capable of use with the present invention.

Referring to FIG. 1 physical resources of a computer system 100 capable of use in practicing the present invention are depicted. The computer 100 has a central processor 101 connected to a processor host bus 102 over which it provides data, address and control signals. The processor 101 may be any conventional general purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to periphieral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an,,operating system to be "booted" from the disk 113. Examples of high-level operating systems are, the Microsoft Windows 98™, Windows NT™, UNIX, LINUX, the Apple MacOS™ operating system, or other operating systems.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of designs, robot configurations, workspaces, and workplace environments on the video computer display 115.

The Assembly Workcell Layout Problem and Assumptions

The assembly workcell, layout problem involves determining the relative positions of peripheral machines in the neighborhood of the robot that interacts with them. The aim is to optimize one or more of the workcell efficiency criteria. According to the invention, a single criterion was considered for optimization, i.e., the cycle time corresponding to the assembly task that has to be fulfilled. The effort required for calculating such a criterion can be quite substantial in an industrial CAD/CAM/CAE system. Indeed, each evaluation implies a simulation of the robot movement, as controller manufacturers provide their own simulation modules for their robots.

The following factors must be taken under consideration:
1. The shape of the machines can be odd. This introduces the problem of finding a method of representation that limits the number of possible orientations of the machines relative to the robot, and the problem of detecting efficiently the overlapping of the machines.
2. Every machine has at least one access/delivery point, which is the point that a robot must reach to carry out the task associated with the machine.
3. Machines should be arranged with enough space between them to allow for maintenance, repair and operator's movement. The allowances may differ for different machines.
4. There may be more then one robot involved in the assembly task.
5. The machine access/delivery points must be placed in the workspace of the robot that must reach them.
6. The base of a robot may be moveable. A mobile robot needs extra space between the machines to move about.

The general assembly workcell layout problem is very complex and combinatorial. Therefore, some simplifications and assumptions are made, which are reasonable and practical:
1. The workcell consists of one fixed-based robot and a set of peripheral machines.
2. The operation sequence associated with the assembly task is fixed.
3. The type and shape of machine considered is not limited.
4. A machine has only one access/delivery point. This assumption is reasonable as most machines have only one such point. The position of the access point on a machine is not limited to the "center" of the machine.
5. Space allowance between machines is to be provided by the user. The internal representation of a machine will be determined taking account of the space allowances.
6. The floor spade available for the layout is assumed to be unlimited. Slight shifting of the machines to suit available floor space will not affect the result significantly. Moreover, the layout may be displaced as a whole to fit given floor area.

To provide reliable solution to practical and industrial cases, the following constraints must be taken into account:
1. Accessibility of the machine access points.
2. Collision avoidance between the robot and its environment, when the robot tool reaches a point where work is to be performed.
3. Collision avoidance between the robot and its environment, when the robot arm is moving from access point to access point.

Finally, the following initial data are to be provided by the user: the assembly robot model, the machines with which it interacts, and the operation/interaction sequence corresponding to the assembly task to be performed.

The Workcell Layout Solution

The overall cycle time, for a robot to perform a given assembly task depends on its position relative to the objects in its environment, such as peripheral machines. A workspace that is not well laid-out results in inefficient operation. This leads to the problem of choosing the layout in such a way that manipulator performance is optimized while a specified task is accomplished.

In existing robotic CAD systems, the process for optimizing cycle time is a very time-consuming operation. According to the present invention, this task is made more efficient by employing a constructive algorithm approach where peripheral machines are added to the workspace one-by-one. Each time a peripheral machine is added, a modified simulated annealing method is employed to determine a set of possible layouts including the new peripheral machine. Only the best layouts are accepted for subsequent evaluation. The method is streamlined by simplifying the geometries of the robot and the peripheral machines to reduce CPU time. The method is further streamlined by adding peripheral machines in a specific order that is determined by favoring peripheral machines that are accessed often in the assembly process and by favoring small machines, with the result that machines accessed often will be placed near the robot, and small machines will be clustered around the robot, with large machines on the periphery.

Figure 2:
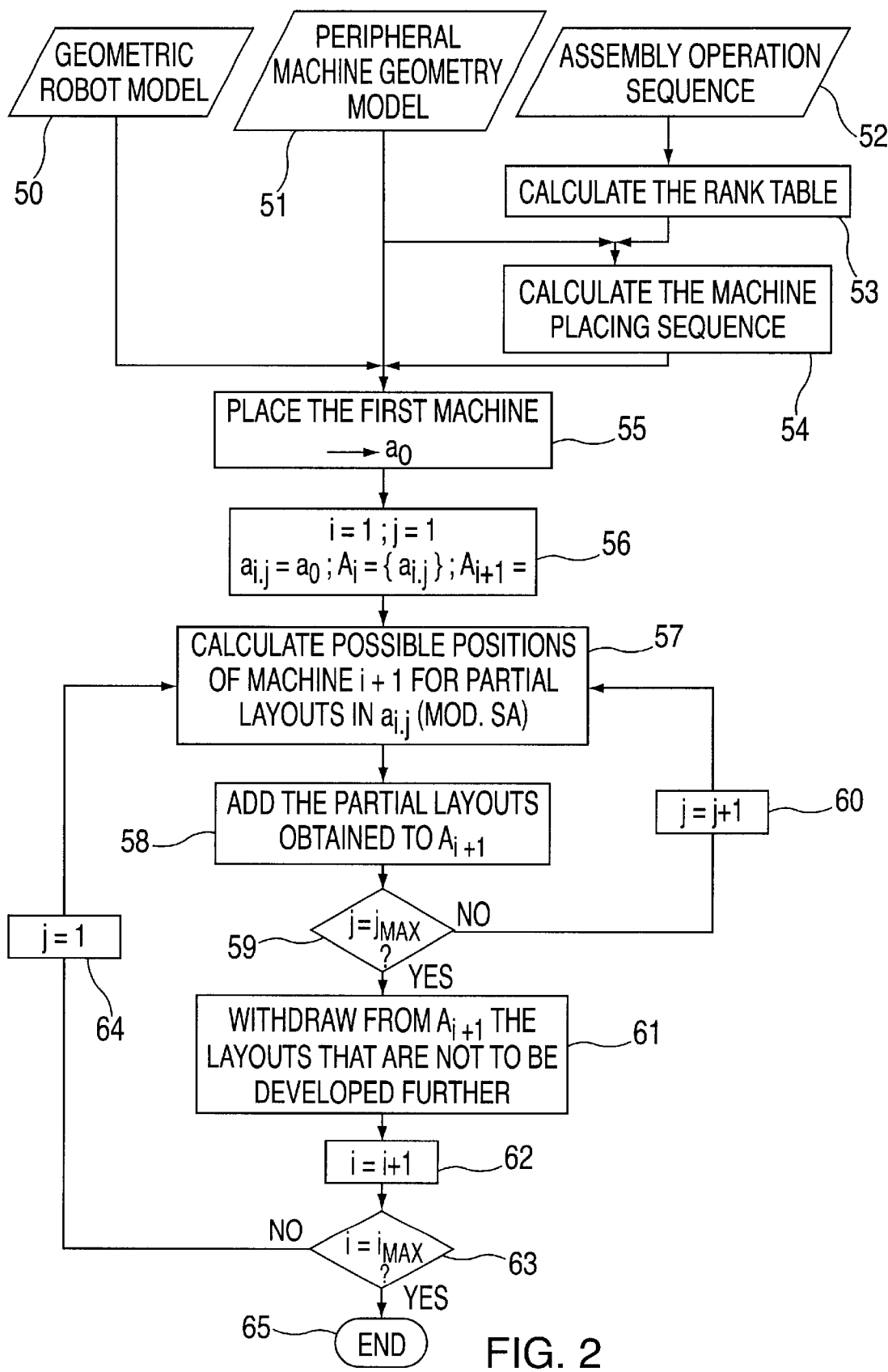
FIG. 2 is a schematic representation of the system of the invention.

Referring to FIG. 2, a schematic representation of the method of the present invention is shown. The system uses data stored either within the system, or external to the system, relating to the geometry of the specific robot model 50, the geometry of each of the peripheral machines 51, and the assembly operation sequence 52. In step 53, a "rank table", which will be more fully described herein, is calculated. The information in the rank table is used to calculate cycle time. It records the number of times a robot accesses a particular machine, and the number of movements between machines. In step 54 the order in which peripheral machines will be placed in the workcell is determined. In the preferred embodiment, the machine placing sequence is determined using information from the rank table, as well as the information relating to the configurations of the peripheral devices, as described below.

In step 55 the robot is placed in the workspace, and the first peripheral machine is placed in proximity to the robot, so that it is easily accessed by the robot. This configuration is denoted as the first layout, denoted "$a_0$". In step 56, the parameters "i" and "j", which are counters, are initialized to a value of one. The value of "$i_{max}$" corresponds to the total number of machines to be added, and the value of "$j_{max}$" corresponds to the number of, layouts to be evaluated when adding a machine, as described below. The parameter "a" denotes individual layouts, and the parameter "A" is the entire set of layouts for a machine "i".

Thus, continuing with the process, it is now desired to place the second peripheral machine in the workcell in such a way that cycle time will be minimized. According to the invention, a modified simulated annealing method, described below, is used to generate a set of possible placements for the second peripheral machine. The number of possible locations that the modified simulated annealing method may generate is not arbitrarily restricted. The method may generate only a few placements, or it may generate many placements, depending on the configuration of the workspace and other objects in the workspace. Assuming for the sake of illustration that fifteen possible placements are generated, then each of those placements defines one of fifteen partial layouts, where the robot and the first machine are in the same place, but the second machine is in a different place. The fifteen partial layouts are placed into the set of partial layouts "A" corresponding to the second machine (step 58). The process continues in step 59 where the query is made as to whether parameter "j" is equal to "$j_{max}$". Recall that parameter "j" is a counter that was initialized to a value of one in step 56 and parameter "$j_{max}$" is the number of current partial layouts that are being used as a basis for evaluation. Since at this stage there is only one current partial layout, i.e., the one layout with the robot and the first machine, "$j_{max}$" has a value of one. Therefore, the query of step 59 is answered in the affirmative, and we proceed to step 61. In step 61 the fifteen partial layouts that were generated with the modified simulated annealing method are compared to each other for cycle time, and only the best are selected. It is up to the user to define what number of partial layouts will be selected, depending on available CPU time. In the preferred embodiment, only the five best layouts are kept, and the rest are removed from consideration. Since the set of partial layouts for further evaluation now contains five partial layouts, the value of "$j_{max}$" is set to 5. Having determined a set of partial layouts for machine number 2, the counter corresponding to the machine number, i.e., "i", is advanced by a value of one (step 62) so that the process can repeat for the remainder of the machines.

Proceeding to step 63, the query is made as to whether there are more machines to be added (Does $i=i_{max}$?). In the event that more machines are to be added (step 63, no), we proceed to step 64, where counter "j" is reset to a value of one. The simulated annealing program is then run for each of the five current partial layouts. Thus, returning to step 57 the modified simulated annealing method begins with the first of the five current partial layouts and generates a set of possible layouts including the third peripheral machine. Those layouts are stored in set "A" (step 58) and the query of step 59 is answered in the negative, since the value of "j" is one, and the value of "$j_{max}$" is now 5. The value of "j" is increased by one in step 60 and the modified simulated annealing method is performed again to yield a set of possible layouts including the third peripheral machine, using as a starting point the second of the five current partial layouts. This process is continued until all five of the current partial layouts have been used as a starting point for generating partial layouts for the third machine. At this point the value of "j" will equal "$j_{max}$", which, as stated above, has a value of five in the preferred embodiment, and the query of step 59 will be answered in the affirmative.

At this stage, the set of partial layouts including machine number 3 can potentially be quite large. For example, if fifteen new layouts are generated for each of the five current partial layouts, then the set of partial layouts for machine number 3 will include seventy-five partial layouts. Again, in step 61, all of the layouts are compared, and only the best are kept. By eliminating the remainder, the process time is restricted to reasonable limits. The process is repeated until all of the machines have been placed in a layout ($i=i_{max}$)(step 63), at which point the process ends. At the end of the process, assuming the user has chosen a value of five for "$j_{max}$", the user will be presented with five complete layouts.

It is advantageous to have more than one solution, since in practice one or more of the layouts may not prove to be feasible, because of factors not taken into consideration in the analysis. In addition, in the event the operation environment or sequence changes somewhat, causing one or more of the solutions to be nonviable, the user still has other solutions to choose from.

The foregoing describes the overall method of the invention. The modified simulating annealing method of the present invention, as well as methods to optimize the process, according to the preferred embodiment of the invention, are discussed below.

Defining the Operation Sequence

Since standard CAD/CAM/CAE tools for describing a sequence of operations associated with an assembly task are malsuited to the task, a new user interface was designed to minimize the number of interactions necessary for the user in the preferred embodiment.

This interface allows a user to define robot movements between machines, instead of work points in the robot workspace. More precisely, the user can define what has been termed "machine-machine interactions". Such interactions occur when the robot brings an element (a piece or a tool) from one given machine to a second machine. In this regard, note that an interaction where the robot moves between machines without carrying anything is not a machine-machine interaction. Indeed, such an interaction can be deduced from the previous interactions, and it is not necessary to specify it explicitly.

This is illustrated by way of example. The workcell consists of a robot and three peripheral machines (machine 1, machine 2, and machine 3). The task to be performed is as follows: grasp twice in succession a given piece from machine 1 and place the pieces on machine 2; grasp a given tool on machine 3 and assemble the pieces on machine 2; bring the tool back to machine 3.

Figure 3:
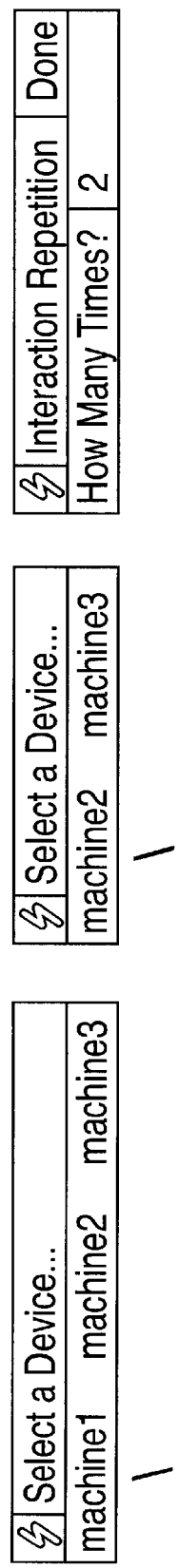
FIG. 3 is an example of a graphic tool for defining a machine-machine interaction, according to the preferred embodiment of the invention.
Figure 4:
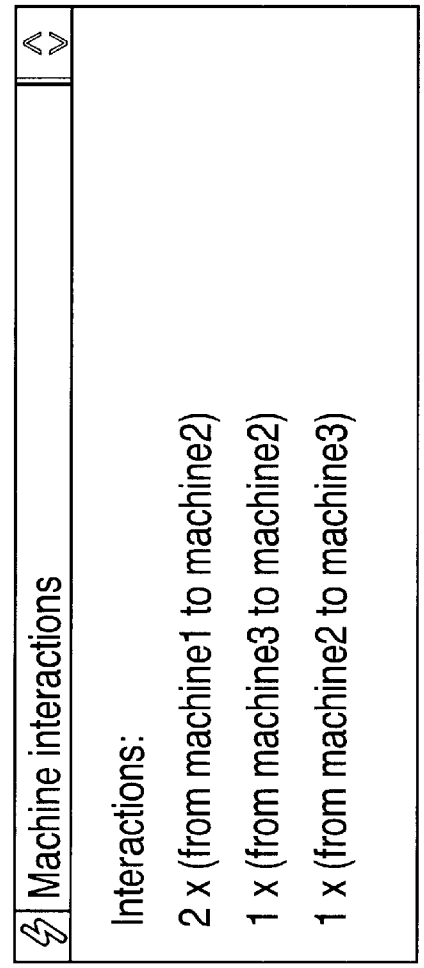
FIG. 4 is an example of a graphic display conveying the machine interaction sequence, according to the preferred embodiment of the invention.

The interface proposed allows the user to describe a machine-machine interaction by simply clicking successively on the initial and goal machine names, and by entering the number of repetitions of the interaction. These steps are illustrated in FIG. 3 for the interaction between machines 1 and 2. While describing the interaction sequence, the user can check the interactions defined so far, as shown in FIG. 4. All the interactions are displayed therein.

The machine sequence (i.e., the order in which the robot must go to the machines) is then deduced directly from the interaction sequence. For the example used so far, the sequence is the following:

mac.1-mac.2-mac.1-mac.2-mac.3-mac.2-mac.3

Figure 5:
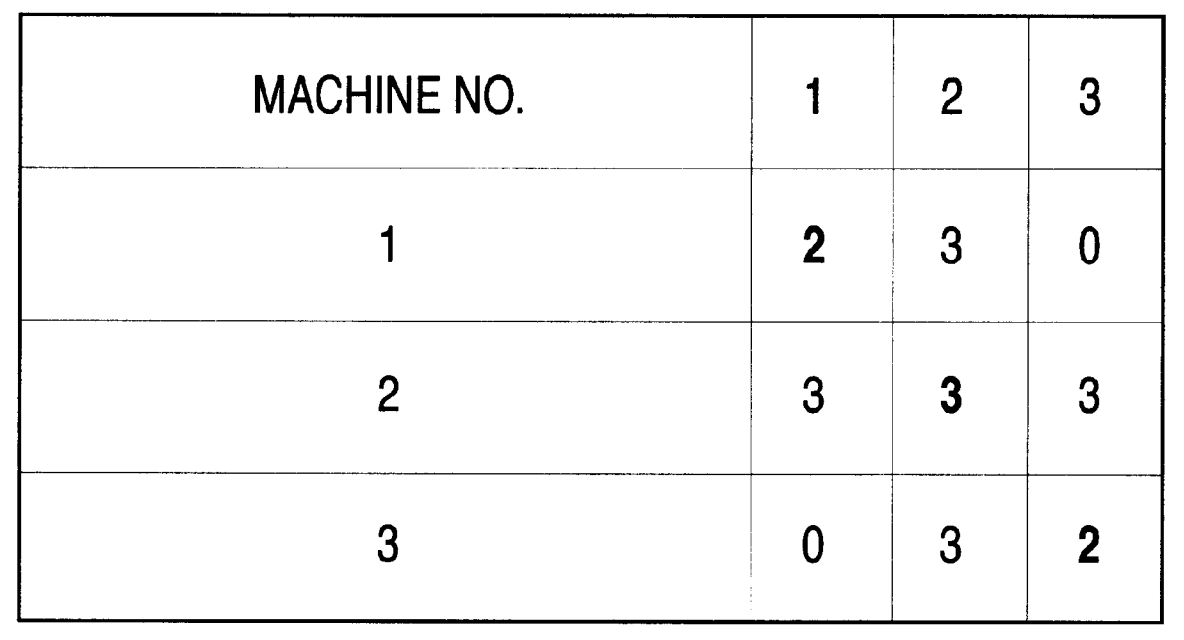

Next, a rank table, that is used to calculate the cycle time, is generated (FIG. 5). The i,i element of the table is the number of times the robot accesses machine i. The i,j and j,i elements of the table correspond to. the number of movements (not interactions) between machine i and machine j, whatever the order.

Simplifying Three-Dimensional Machine Representation

The two-dimensional machine internal representation presented here is aimed at simplifying the numerous collision calculations during optimization. It describes exactly the shape of any rectilinear machines, i.e., machines composed of some low-level rectangular elements (rectangles, for short), such as rectangle-shaped, L-shaped or T-shaped machines. Shapes such as circles or polygons are only represented by bounding rectangles. Such approximations are reasonable since the shape of most machines is rectilinear.

First, the two-dimensional approximate contours of the machines on the floor space are calculated:

$$B = \{b_i / 1 \leq i \leq m\}$$

where $b_i$ is the bounding rectangle of the machine i; and m is the number of machines.

Next, the set of rectangles that makes up $b_i$ is deduced, if necessary, from the three-dimensional initial representation of the machine i:

$$B_i = \{b_{ij} / 1 \leq j \leq m_i\}$$

where $b_{ij}$ is the decomposed rectangles for the machine i; and $m_i$ is the number decomposed rectangles for the machine i.

Figure 6:
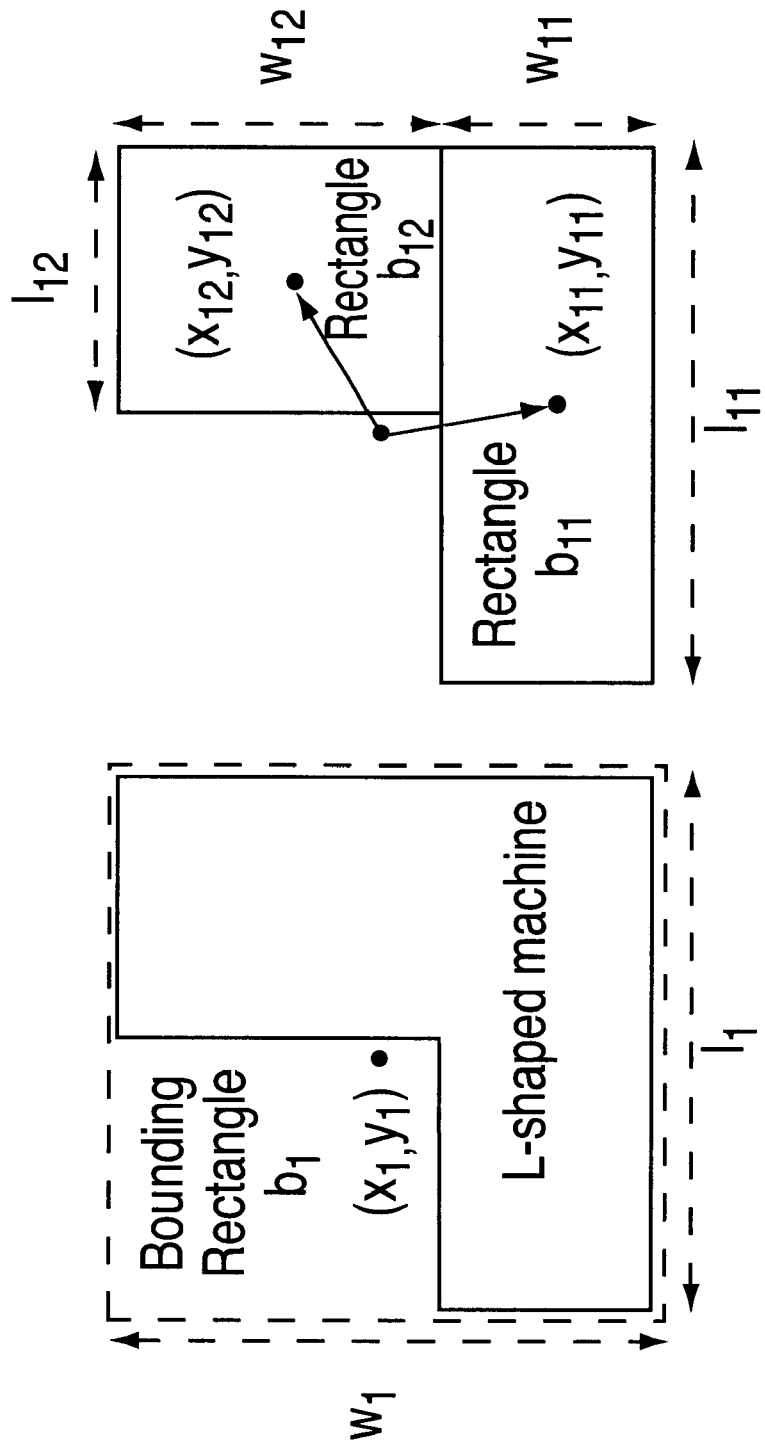
FIG. 6 illustrates the relationship between a bounding rectangle of a machine and its corresponding constituent rectangles, for simplifying the shape of machines to be placed in the workcell, according to the preferred embodiment of the invention.

For each partitioned rectangle $b_{ij}$, $x_{ij}$ and $y_{ij}$ are the x and the y coordinates of the middle of rectangle $b_{ij}$. The width and the length of rectangle $b_{ij}$ are $w_{ij}$ and $l_{ij}$. We assume the separate component rectangles in a rectilinear machine are solid-connected, which means the offsets among these rectangles are kept constant. Thus, during the placement process, we should keep the offsets among all the rectangles $b_{ij}$ in a set $B_i$. For simplification, we give $xo_{ij}$ and $yo_{ij}$ as two constants to represent the x and y offset from the middle of $b_i$ to the middle of $b_{ij}$. For the bounding rectangle $b_i$ of the machine i, $x_i$ and $y_i$ are the x and the y coordinates of the middle of $b_i$. The width and the length of $b_i$ are $w_i$ and $l_i$. Then, we can define the middle of a rectilinear machine i as the middle of its related bounding rectangle bi, and define the x-offset and the y-offset from $b_i$ to $b_{ij}$ as $xo_{ij}=xb_{ij}-x_i$ and $yo_{ij}=yb_{ij}-y_i$, respectively. FIG. 6 presents a simple example to demonstrate the relationship between a rectilinear machine and its partitioned rectangular cells. All the variables and constants used in this example are labeled to illustrate the relationship of these notations.

Detecting Overlapping Machines

The previous representation provides a simple and fast function, which is the detection in two dimensions of overlapping machines. Indeed, the solution sought for the robot workcell layout problem is to minimize the cycle time necessary to achieve a predefined task, under the criterion that the machine overlap $C_{mo}$ is zero. $C_{mo}$ can be defined as follows:

$$C_{mo} = \sum_{i=1}^{m} \sum_{j=1}^{m_i} \sum_{k=i+1}^{m} \sum_{l=1}^{m_k} od_{ij,kl} \qquad (1)$$

In equation (1), the overlap distance, $od_{ij,kl}$, is a symbolic representation of the machine overlap between $b_{kl}$ and $b_{ij}$. It can be defined as follows:

$$od_{ij,kl} = (id_{ij,kl} - d_{ij,kl}) \times f_h(id_{ij,kl} - d_{ij,kl}) \qquad (2)$$

$$id_{ij,kl} = \min\left(\frac{lb_{ij} + lb_{kl}}{2 \times |dx_{ij,kl}|}, \frac{wb_{ij} + wb_{kl}}{2 \times |dy_{ij,kl}|}\right) \times d_{ij,kl} \qquad (3)$$

where $id_{ij,kl}$ is the ideal minimum distance between $b_{kl}$ and $b_{ij}$ that minimizes the machine overlap; and function $f_h(\cdot)$ used in equation (2) is the 0-1-hardlimit threshold function where $f_h(x)=1$ if $x>0$, otherwise $f_h(x)=0$.

Figure 7:
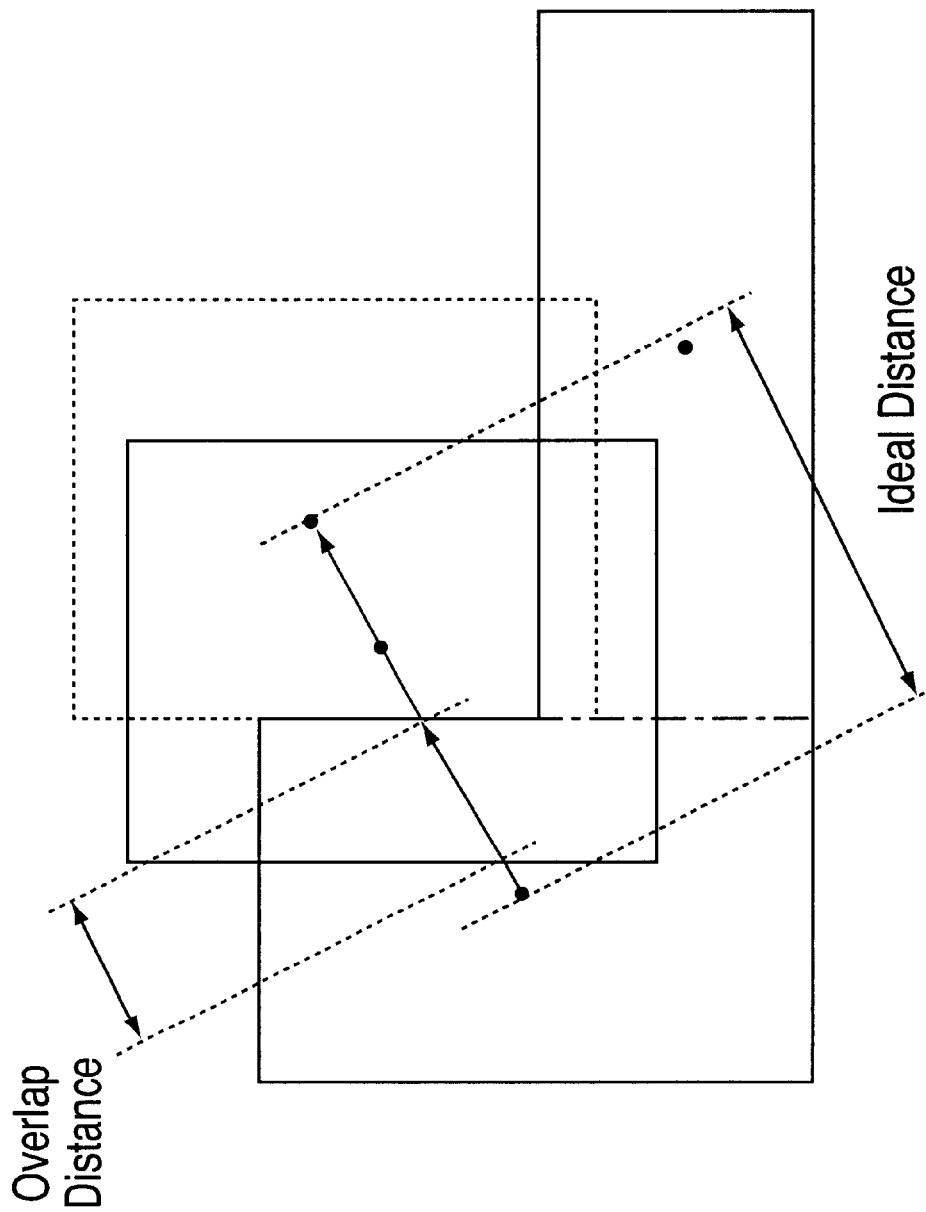
FIG. 7 illustrates the. overlap distance and the ideal distance between machines in the workcell, according to the preferred embodiment of the invention.

The Euclidean distance $d_{ij,kl}$ between $b_{kl}$ and $b_{ij}$ is defined as:

$$d_{ij,kl} = \sqrt{dx_{ij,lk}^2 + dy_{ij,kl}^2} \qquad (4)$$

where $dx_{ij,kl}=xb_{kl}-xb_{ij}$ and $dy_{ij,kl}=yb_{kl}-yb_{ij}$ are defined as the x and y coordinate displacement from the middle of $b_{kl}$ to the middle of $b_{ij}$, respectively. FIG. 7 presents an example with a simple L-shaped machine and a rectangular machine to demonstrate this representation method.

Defining the Workcell Floor

The workcell layout optimization method used in the preferred embodiment requires the calculation of an initial placement for each machine. This placement must in particular avoid machine overlaps.

To determine such placements, a workcell floor representation, derived from the "spatial representation method" presented in B. K. A. Ngoi and K. Whybrew, "A Fast Spatial Representation Method", *The International Journal of Advanced Manufacturing Technology*, 8(2), pp. 71–77, 1993, was used. A two-dimensional matrix is updated each time a machine is to be placed, and represents the current layout of the machines on the floor space. The first row and first column of the matrix correspond to the x and y coordinates of the layout. Remaining matrix cells contain "0" or "1", depending on their occupation by a machine ("0" represents empty spaces).

Figure 8:
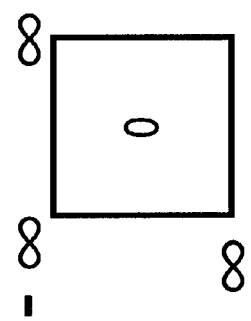
FIG. 8 illustrates a two-dimensional representation of workcell floor space, before any objects are placed in the workcell, according to the preferred embodiment of the invention.
Figure 8:
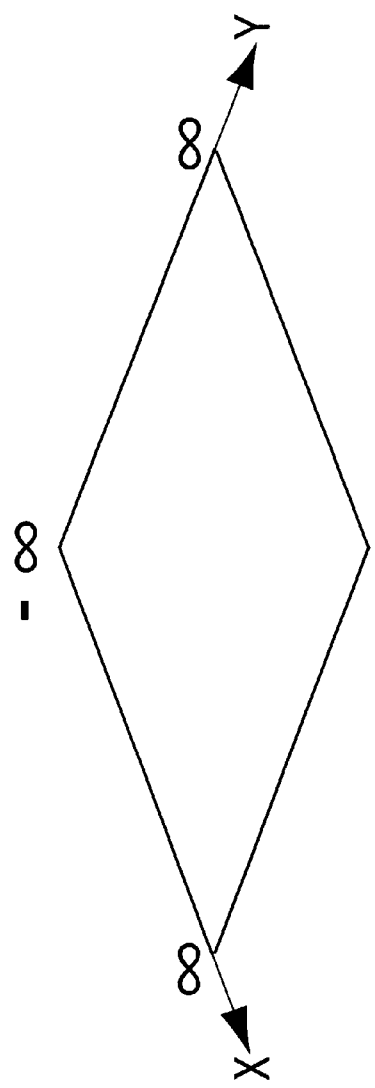

FIG. 8 shows how the initial floor space is represented. The initial two-dimensional matrix is shown in a schematic manner, for better understanding. As mentioned above, the space available is assumed to be unlimited.

Figure 9:
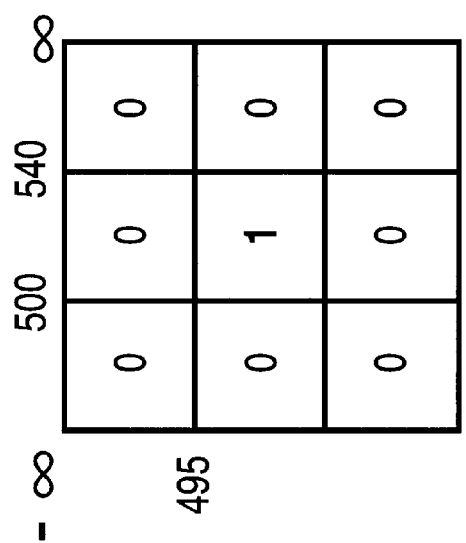
FIG. 9 illustrates a two-dimensional representation of the workcell floor space, with one object placed thereon, according to the preferred embodiment of the invention.
Figure 9:
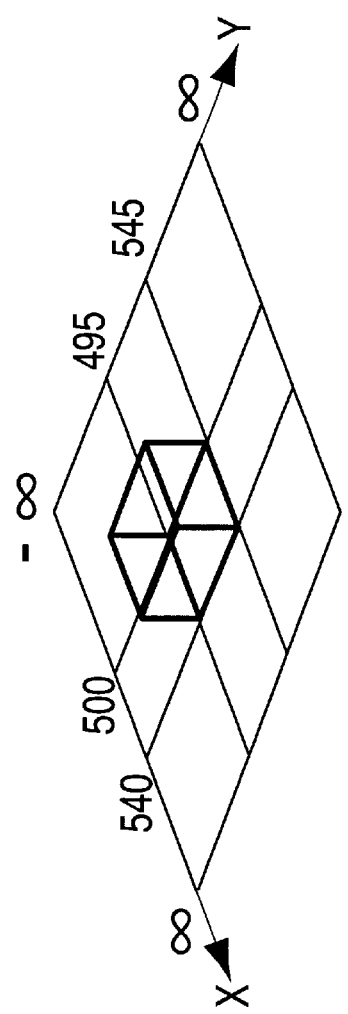

For purposes of illustration, assume that a rectangular-shaped machine, named "machine 1", dimensions of which are $l_1=40$ and $w_1=50$, is placed on the floor with $x_1=520$ and $y_1=520$. The two-dimensional matrix then expands to a 4×4 matrix, and the floor space is divided into 9 sections indicated by the dotted lines on the floor area (FIG. 9).

Figure 10:
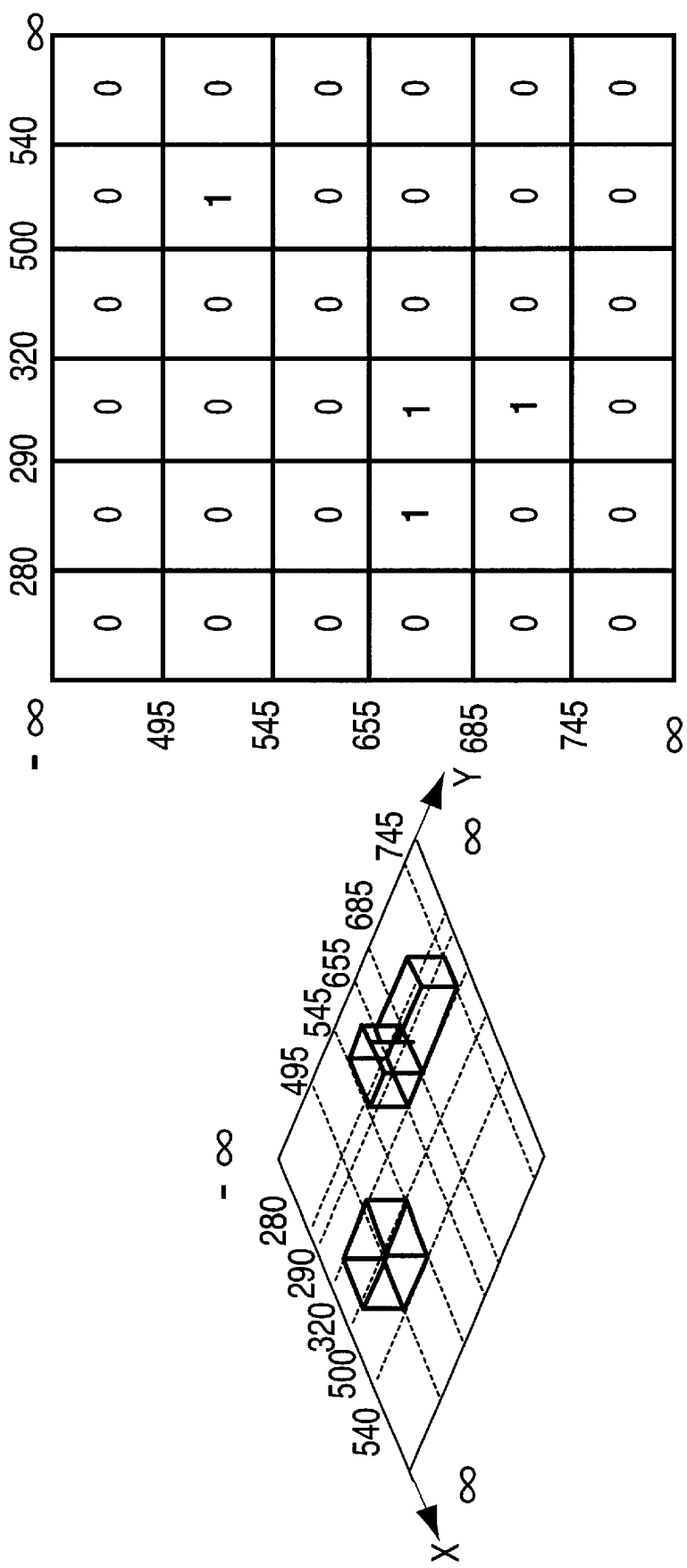
FIG. 10 illustrates a two-dimensional representation of the workcell floor space, with three objects placed thereon, according to the preferred embodiment of the invention.

If an L-shaped machine, named "machine 2", dimensions of which are $l_{21}=30$, $w_{21}=60$, $l_{22}=40$ and $w_{22}=30$, is then placed with $x_2=300$ and $y_2=700$, the matrix obtained is 7×7, as illustrated in FIG. 10.

As more peripheral machines are placed on the floor space, the two-dimensional matrix expands step by step to accommodate the additional information. When a machine is to be placed on the floor, only empty cells are selected. Thus, this floor representation will give a fast way of determining possible initial positions for a machine when the optimization method is applied.

Successive Machine Placement Rule

As stated above, according to the method of the present invention, the peripheral machines are added one-by-one to the layout of the workcell, and at each step the modified simulated annealing method of the invention is used to find optimal placements for the machine being added. The machines can be added in any order. However, according to the preferred embodiment, better results are obtained when the machines that are accessed most by the robot, and that are smaller, are added to the workcell first. An existing rule proposed in M. L. Tay and B. K. A. Ngoi, "Optimising Robot Workcell Layout", *The International Journal of Advanced Manufacturing Technology*, 12(5), pp. 377–385, 1996 was used to select successively the machines to be placed in the workcell, which proved to be quite efficient.

The selection of the first machine to be placed is rather different from the selection of subsequent machines. It is based on the demand of the machine, i.e., the number of times the robot must access the machine. The reason for using the highest-demand value as the criterion is that a machine with greatest demand will have the highest interaction with other machines. Thus, it should be placed first so that other machines with which it interacts can be placed around it. Should there be more than one machine having the same highest-demand value, the machine with the smallest base area will be chosen.

The subsequent machines are chosen according to the following criterion:

$$C_i = \sum_{j=1}^{n} \frac{I_{ij}}{I_{maxj}} + kS_i \quad (5)$$

where $I_{ij}$ is the number of interactions of machine i with the already placed machine j ($i \neq j$);

$I_{maxj}$ is the largest interaction value associated with machine j;

$S_i$ is the normalized base area of machine i;

n is the total number of machines; and k is a weighting value assigned to size, and is equal to 0.5. The normalized base area $S_i$ is defined as follows:

$$S_i = \frac{A_{min}}{A_i} \quad (6)$$

where $A_{min}$ is the smallest base arena among the machines; and $A_i$ is the area of the machine i.

Since equations (5) and (6) favor machines with small areas, large machines will be placed at the peripheral of the workcell.

Placement of Machines

As discussed, the robot is placed in the workcell first. The first peripheral machine is then placed in the workcell. At this stage, there is no optimization to be done, since there are no other machines in the workspace to serve as obstacles to the movement of the robot with respect to the first machine. Therefore, the first machine is simply placed in a location that is readily accessible to the robot, as determined by the geometry of the robot and the machine. According to the preferred embodiment of the invention, the first machine is place in the center of an "acceptable base location domain", depicted in FIG. 11, item 60. Using standard functionality with existing CAD systems, such as the "collision testing" function of the "CATIA Design and Robot Programming Solution" system sold by Dassault-Systémes, Suresnes, France, an acceptable robot base location domain is calculated, as represented in FIG. 11.

a) Acceptable Base Location Domain

Figure 11:
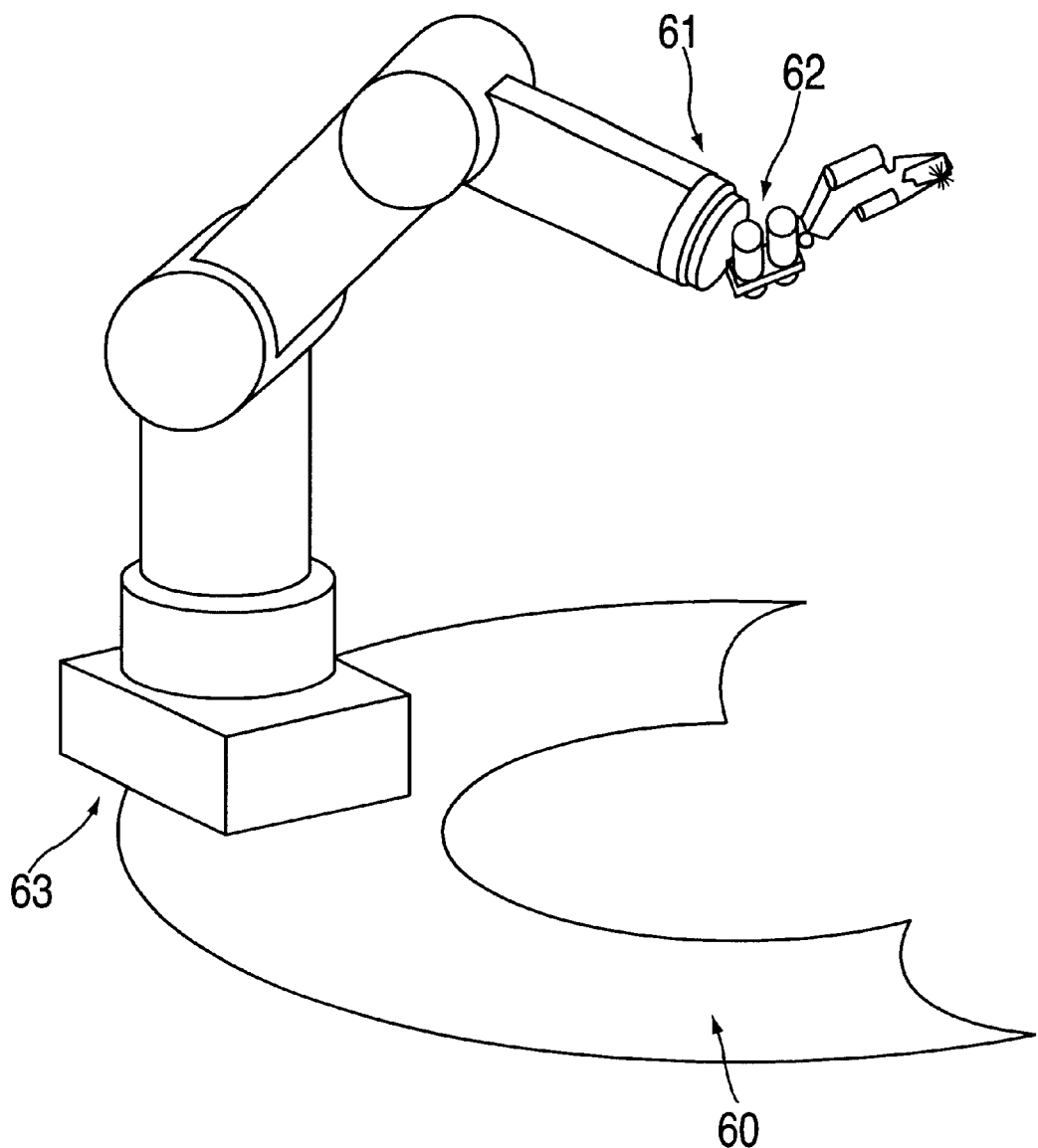
FIG. 11 is a graphic depiction of a robot, with its base positioned within an acceptable base location domain, in a horizontal plane, according to the present invention.
Figure 12:
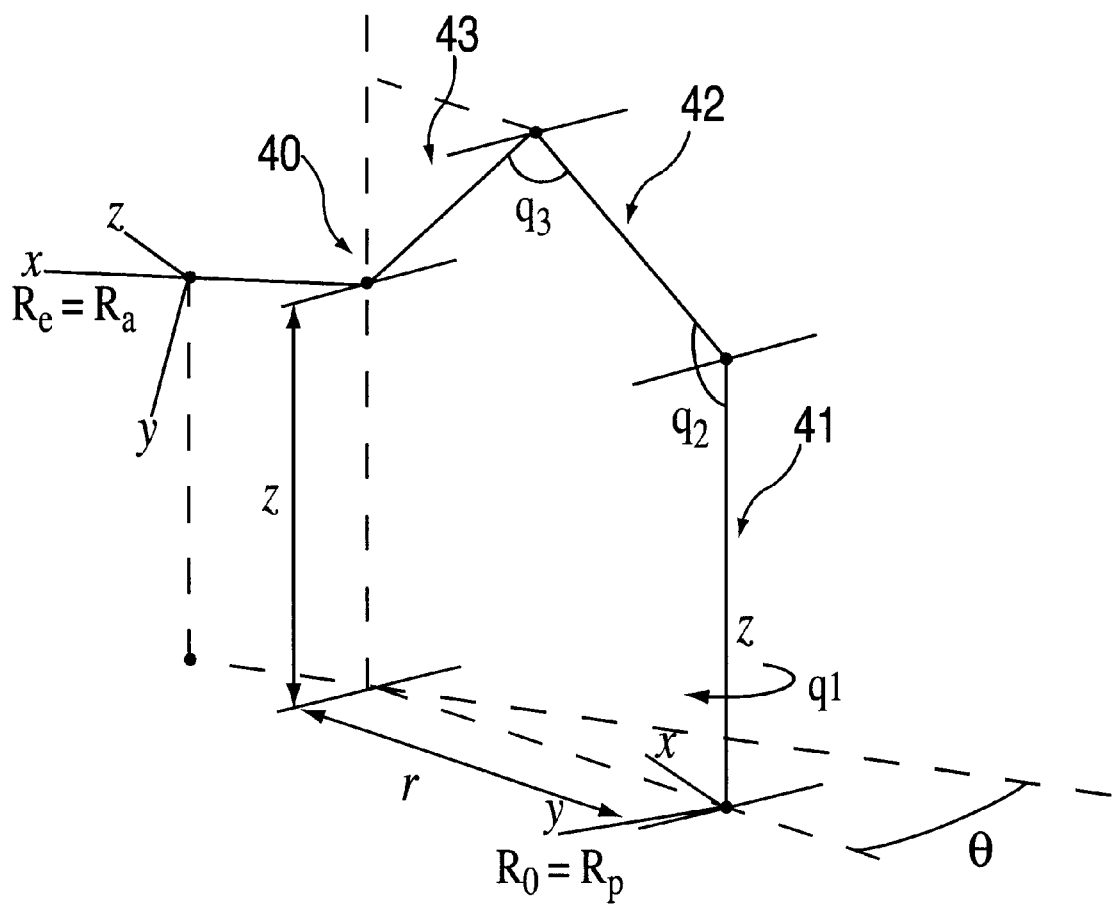
FIG. 12 is a graphic depiction of a robot located within a coordinate system, showing its axes of movement.

Referring to FIGS. 11 and 12, the method of determining an acceptable base location domain is described in detail. An acceptable base location domain is a portion of a plane which, when the robot base is located therein, allows the robot manipulator to reach a given work point. To determine this domain, the physical geometry and kinematics of the robot must be considered. The approach is based on physical observation of a given robot manipulator that must reach a six-dimensional reference frame in the work space. For: current industrial robots (6 axes with 3 orthogonal intersecting axes for the wrist), the primary arm (first three axes fixing the position, FIG. 12, items 41, 42 and 43), and the wrist (last three axes fixing the orientation) can be disassociated.

Referring to FIG. 12, we define Ro as the reference frame for the base of the robot, $R_p$ as the reference frame for the center of the robot's wrist, $R_e$ as the reference frame for the end of the effector or tool reference, and $R_a$ as the reference frame linked to the welding point to be reached. $R_0$ can be conveniently referenced with respect to $R_p$ using a cylindrical coordinate system (r, θ, z), when $R_e$ and $R_a$ coincide.

In this coordinate system, we obtain the following system of equations for a 3-axis primary arm:

$$\begin{cases} r = l_2 \times \sin(q_2) - l_3 \times \sin(q_2 + q_3) \\ z = l_1 - l_2 \times \cos(q_2) + l_3 \times \cos(q_2 + q_3) \\ \theta = q_1 \end{cases}$$

where $l_i$ is the length of the segment i of the arm, and $q_i$ is the value of articulation i.

Using this system of equations, one can analytically compute, in horizontal planes (for which z is constant), the Values of r, depending on those of $q_2$, $q_3$, or $q_2+q_3$.

The method first proceeds in two stages:
1. Analysis of the workspace of the robot base, by sweeping the joints of the primary arm within their limits (i.e. $q_{2min}<q_2<q_{2max}$; $q_{3min}<q3<q_{3max}$). This analysis yields a set of circles.
2. Analysis of the limitations due to the elbow configuration (i.e. $0<q_3<\pi$) and the closed kinematic chains (i.e. $q_{pmin}<q_2+q_3<q_{pmax}$). This analysis also yields a set of circles.

Figure 13:
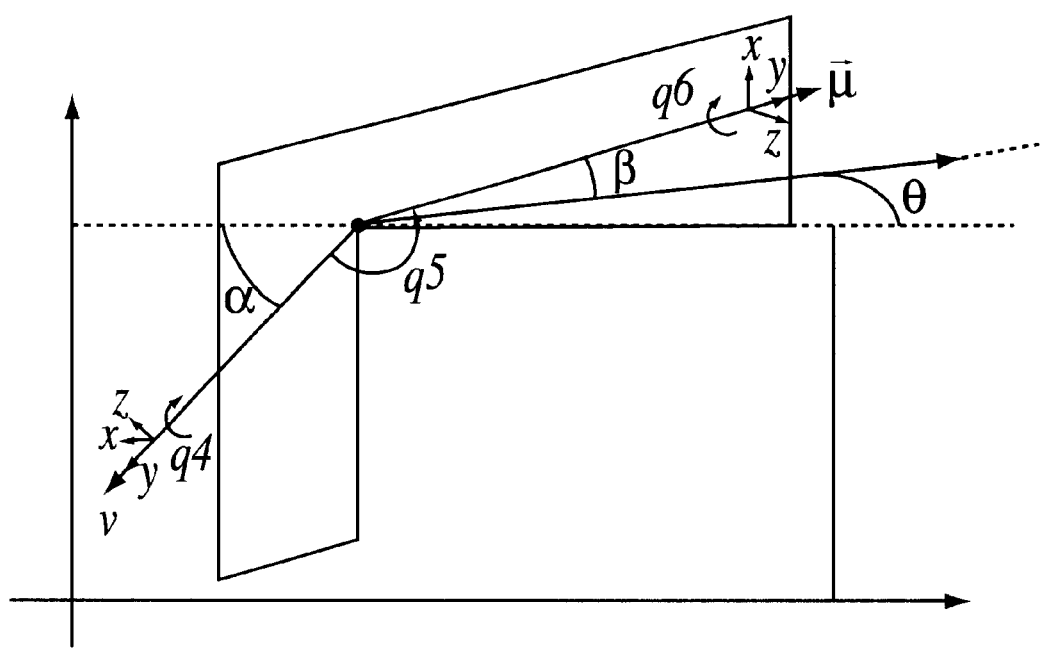
FIG. 13 is a graphic depiction of a the wrist joint coordinate system of a robot, which provides the analytical framework for determining the acceptable base location domain.

Then, we need to take into account the limitations of the wrist joint limits. For a wrist with 3 concurrent axes, the one used most commonly on spot welding robots, the limitation in the wrist's range of movement is due to the fact that the variation of joint $q_5$ is small in practice (i.e. $q_{5min}<q_5<q_{5max}$). Using the notations from FIG. 13, where $\vec{u} =(\sin \theta\cos \alpha, -\cos \theta\cos \alpha, -\sin \alpha)$ is a directing vector of axis 4 and $\vec{v} =(0,\cos \beta,-\sin \beta)$ a directing vector of axis 6, the wrist constraint takes the following form:

$$\vec{u}.\vec{v} < cos(q_{5\ min}) \text{ and } \vec{u}.\vec{v} < cos(q_{5\ max})$$

Given that $$\alpha = q_2 + q_3 - \frac{3\pi}{2}$$

(see FIG. 13), robot base locations for which the wrist is at its limits can be calculated analytically.

Performing the analyses for each point in a set of work points yields a set of plane areas, or faces, the common areas of which delimit the acceptable base location domain. When only one work point is present, only one plane is generated. These sections are represented by faces, which are parts of planes bounded by the projection of a set of curves or lines. As an example, FIG. 11 shows one of these sections 60, for one work point and the "elbow up position". The work point can be reached by the robot if its base is anywhere within the face. For a given set of work points, the acceptable base location domain is the area within the plane that is common to all work point faces.

b) Simulated Annealing

Once the robot and the first peripheral machine are placed in the workspace, then a modified simulated annealing technique of the present invention is used to find optimal or near optimal placements for all of the rest of the machines, as described above with reference to FIG. 2. The modifications to the simulated annealing method will be described below, following a brief review of the simulated annealing method.

The concept of the simulated annealing method is described, for example, in S. Kirkpatrick, C. D. Gelatt, Jr. and M. P. Vecchi, "Optimization by Simulated Annealing", *Science*, 220 (4598), pp. 671–680, May 1983. Simulated annealing is a term referring to a method for solving optimization problems, such as minimizing functions of many variables. Typically, this involves finding some configuration of parameters that minimizes a function, for example, cycle time, which will be referred to as cost herein.

Figure 14:
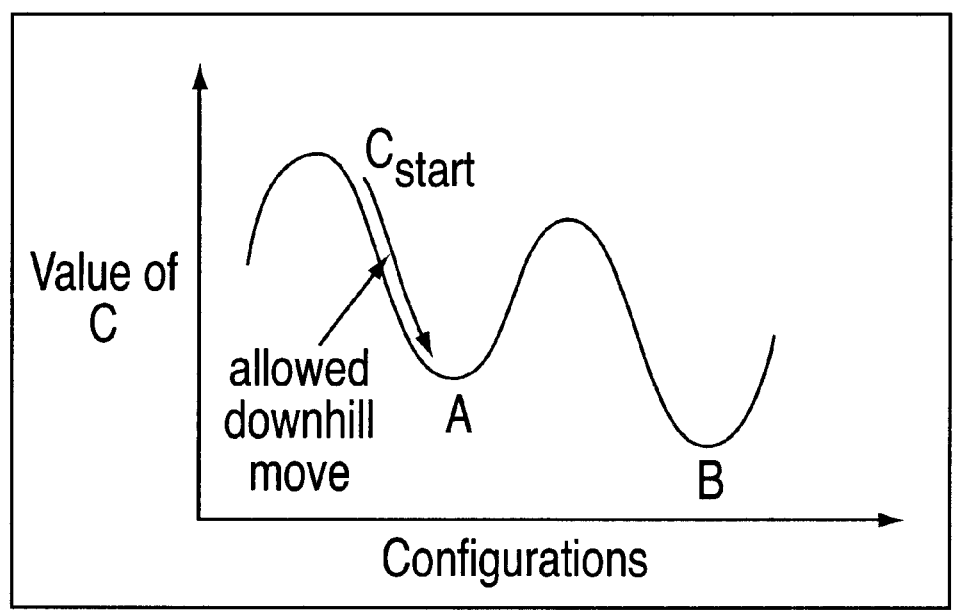
FIG. 14 illustrates the problem of determining a global minimum when local minima are present using a simple iterative method.

Simulated annealing is based on iterative improvement, which involves starting with some existing sub-optimal configuration or solution and perturbing it in a small way. If the new configuration, or solution, is better than the old one then the new solution is accepted and the process is started again. The simple iterative method is somewhat crude in that a new configuration is only accepted if it is an improvement on the old one. Thus, referring to FIG. 14, we begin with an initial configuration. We perturb this and accept only better solutions, i.e., we move downhill only. Therefore, we eventually arrive at point A and cannot go anywhere because uphill moves are not allowed. Thus, we get stuck in a local minimum A even though the global minimum is at point B.

Simulated annealing occurs in the following way. First, a starting point for the minimization is chosen, and labeled as the current point. Next, a new point is picked in the neighborhood of the point. If the new point has a lower function value than the current point, it is automatically adopted as the "current" point for the next step, as in the simple iterative method. If not, then a random number is drawn. That random number determines whether the new point will be adopted as the current point. This gives simulated annealing the ability to jump out of a local minimum.

The implementation of simulated annealing involves prescribing three parameters: the probability that a new point will be accepted, the so-called temperature reduction function, and the number of temperature reductions. They are described as follows:
1. The probability that a new point will be accepted.

If the difference between the new point j and the current point i is less than zero, then the probability of acceptance is 1. If the difference is greater than zero, the probability of acceptance is $$p(\Delta c_{i,j}, T) = \exp\left(\frac{-\Delta c_{i,j}}{T}\right)$$

where $$\Delta c_{i,j}=c(j)-c(i)$$

T is simply a control parameter, which is referred to as the "temperature", in the same units as the cost function.

In the beginning the value of T is relatively large so that many cost-increasing moves are accepted. During the optimization process the temperature is decreased gradually so that fewer and fewer costly moves are accepted.

2. The temperature reduction function.

Kirkpatrick (S. Kirkpatrick, C. D. Gelatt Jr. and M. P. Vecchi, "Optimization by Simulated Annealing", *Science*, 220(4598), pp. 671–680, May 1983) proposed a rate of temperature reduction of 0.95. Sechen (C. Sechen, "VLSI Placement and Global Routing Using Simulated Annealing", *Kluwer Academic Publishers,* Boston, 1988) pointed out that the system requires fewer state changes at high or low temperatures. However, state change is crucial at a medium temperature. Therefore, the temperature reduction rate can be set at 0.8 at the highest and lowest temperatures, but at 0.95 at a medium temperature.

$$T_n=\alpha(T)T_{n-1}(0<\alpha(T)<1)$$

where α(T) denotes the temperature reduction rate.

The initial temperature is chosen so as to accept the first ten layouts encountered at the beginning of the calculation.

3. The number of temperature reductions.

The aim is to decrease the temperature to 5% of its initial value. Therefore, the number of temperature reductions can be deduced directly from the temperature reduction function.

Figure 15:
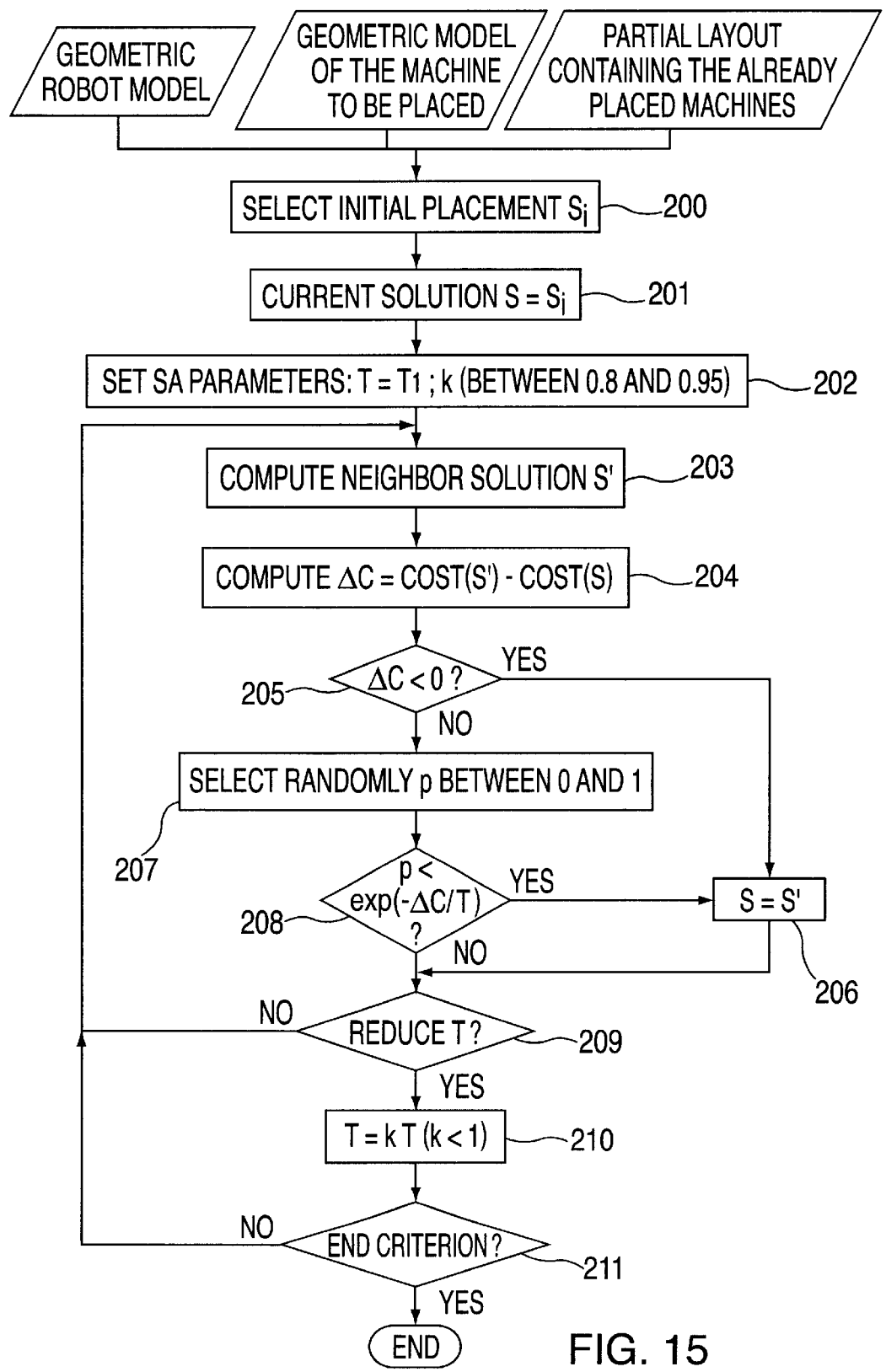
FIG. 15 is a schematic representation of the simulated annealing method.

Simulated annealing generally is shown by reference to the flow chart in FIG. 15. Initially, the first point is selected, step 200, and is set as the current solution, step 201. In addition, the initial parameters, T and k, are set for the simulated annealing method, 202. The cycle time cost solution for a point neighboring the current point is then calculated, step 203, and it is then compared to the current solution, step 204. In step 205, in the event that the new solution is lower than the current solution, then the value for the current solution is automatically replaced with the value for the new solution, step 206 (yes), and the process is repeated. However, if the new solution is higher than the current solution, step 205(no), then a number between 0 and 1 is randomly selected (step 207) and is then compared to the probability value determined by the probability function described above, as shown in step 208. The generation of the random number, and the probability function described above determine whether the new point will be adopted as the current point, and gives simulated annealing the ability to jump out of a local minimum. If the probability function dictates that the new value be accepted, step 208(yes), then the new point is set as the current point (step 206) despite the fact that it is not as good a solution as the current solution. If on the other hand the new point is rejected, step 208(no), then it is determined whether or not the temperature should be reduced for the next set of iterations (step 209). This is determined by whether or not a predetermined number of neighboring solutions has been evaluated. If not, step 209 (no), the process is repeated using the same temperature value. If a sufficient number of solutions have been evaluated, step 209(yes), then the value for T is reduced in accordance with the temperature reduction function described above, step 210. The entire process is repeated until a minimum value for temperature is achieved, step 211, at which time the process is terminated. The number of neighboring solutions which are evaluated prior to changing temperature is set initially by making an educated guess, and later through knowledge based on experience.

c) Modified Simulated Annealing

The present invention involves changes and enhancements to the simulated annealing method, so as to improve the method by increasing the probability of finding the optimal placement for a peripheral machine, and by reducing CPU time. These changes were made for several reasons. Obtaining a single and isolated optimal solution, which is what would be obtained if conventional simulated annealing were employed, is not satisfying in the context of an industrial CAD system. Modified simulated annealing allows for multiple choices for the positioning of a machine.

In addition, the simulated annealing method requires long computation times. One reason for the extensive computation is that simulated annealing cannot distinguish a local minimum from an ordinary solution, unless it visits the very bottom of the local minimum. During the initial phase, when the temperature is high, simulated annealing samples a large area of the research space, but only goes deep into the local minima much later, when the temperature has been lowered. This means that, even if the search enters the global minimum's attraction domain early, the simulated annealing method will not perform a local search, but will continue to search the entire domain. This is highly undesirable. It would be advantageous to build some "opportunism" into the conventional simulated annealing method, so that it commits itself to local explorations in the early stages of the search. According to the present invention, a modified simulated annealing algorithm was designed to achieve that purpose, with two new features:

Freeze-heat cycles.

In order to come up with a solution to the local-exploration problem, two factors are important. The first is that, committing to a local search means in practice performing a gradient descent. The second fact is that simulated annealing is equivalent to a gradient descent when the temperature is close to zero. Thus, in order to add opportunism to the simulated annealing algorithm, it is enough to take the temperature down to nearly zero for as long as it is required to reach the bottom of the local minimum. Afterwards, the temperature can resume its initial- decay schedule. This scheme is called the "freeze-heat cycle".

Remembering local minima.

Figure 16:
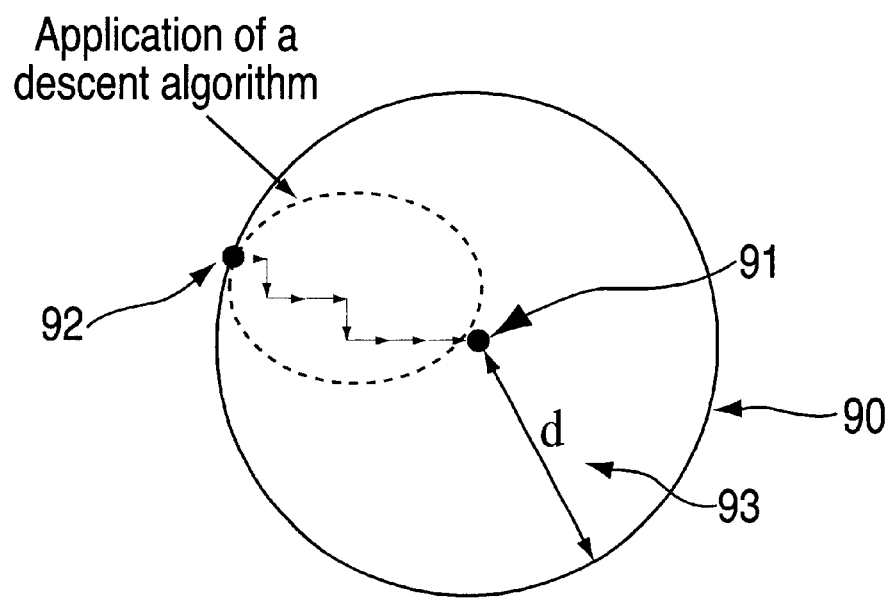
FIG. 16 is a graphic depiction of an "attraction area", according to the present invention.
Figure 17:
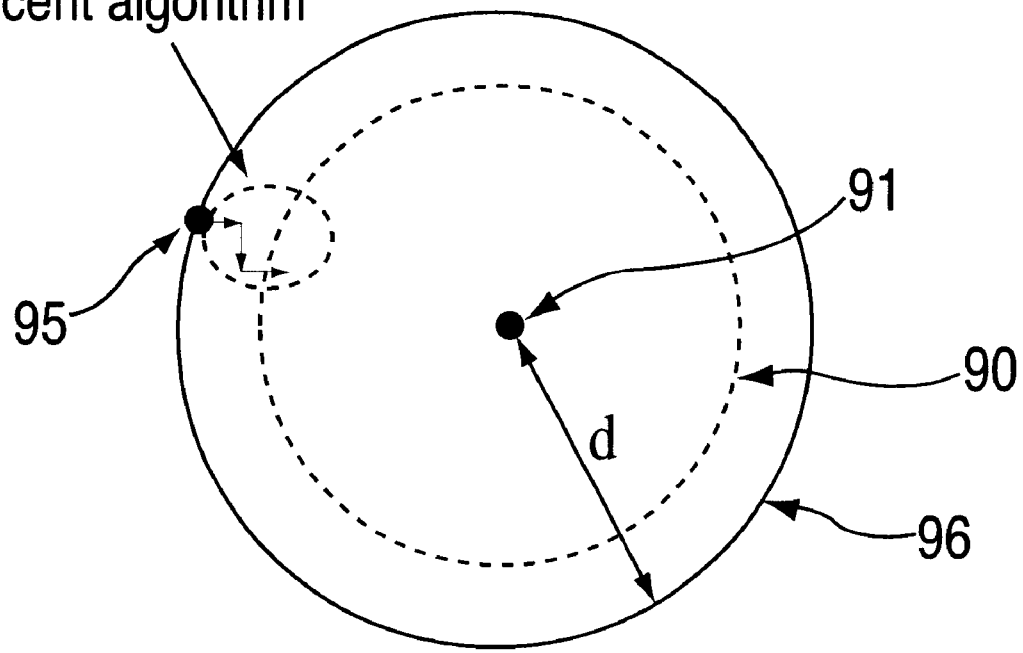
FIG. 17 is a graphic depiction of the expansion of an attraction area, resulting from a gradient descent from an initial data point into an attraction area, according to the present invention.

Ideally it would be advantageous to explore a minimum valley as fast as possible (freezing), escape from it as fast as possible (heating), and never visit it again. In order to avoid revisiting the same local minima, according to present invention, a list of all the local minima found so far is stored, together with an estimate of their attraction areas. For this purpose, the attraction area of a local minimum is defined as the set of all the points from which a gradient descent is supposed to terminate at this local minimum. Practically such sets are impossible to describe analytically and an attraction area will correspond to a circle centered on the local minimum, which passes via the initial location of the gradient descent. This is shown graphically in FIG. 16, wherein the area within the circle 90 is the attraction area. The diameter d (93) is established by the distance from the local minimum 91 to the solution, or location 92, from which the descent algorithm was applied which resulted in finding the local minimum 91. As shown in FIG. 17, any time later during the search that gradient descent from another location 95, which is outside an attraction area 90, terminates in a configuration which is inside 90, the size of attraction area 90 is updated to include the location 95, resulting in an expanded attraction area bounded by the circle 96. Such attraction areas may overestimate the size of a real local minimum attraction area. However, the modified method is formulated so that this does not affect the convergence properties of the simulated annealing method, while giving better results. Gradient descent will indeed be initiated only from configurations which are outside any existing attraction area; while a configuration is within an attraction area, simulated annealing will keep performing random steps, yielding possibly a new minimum.

Figure 18:
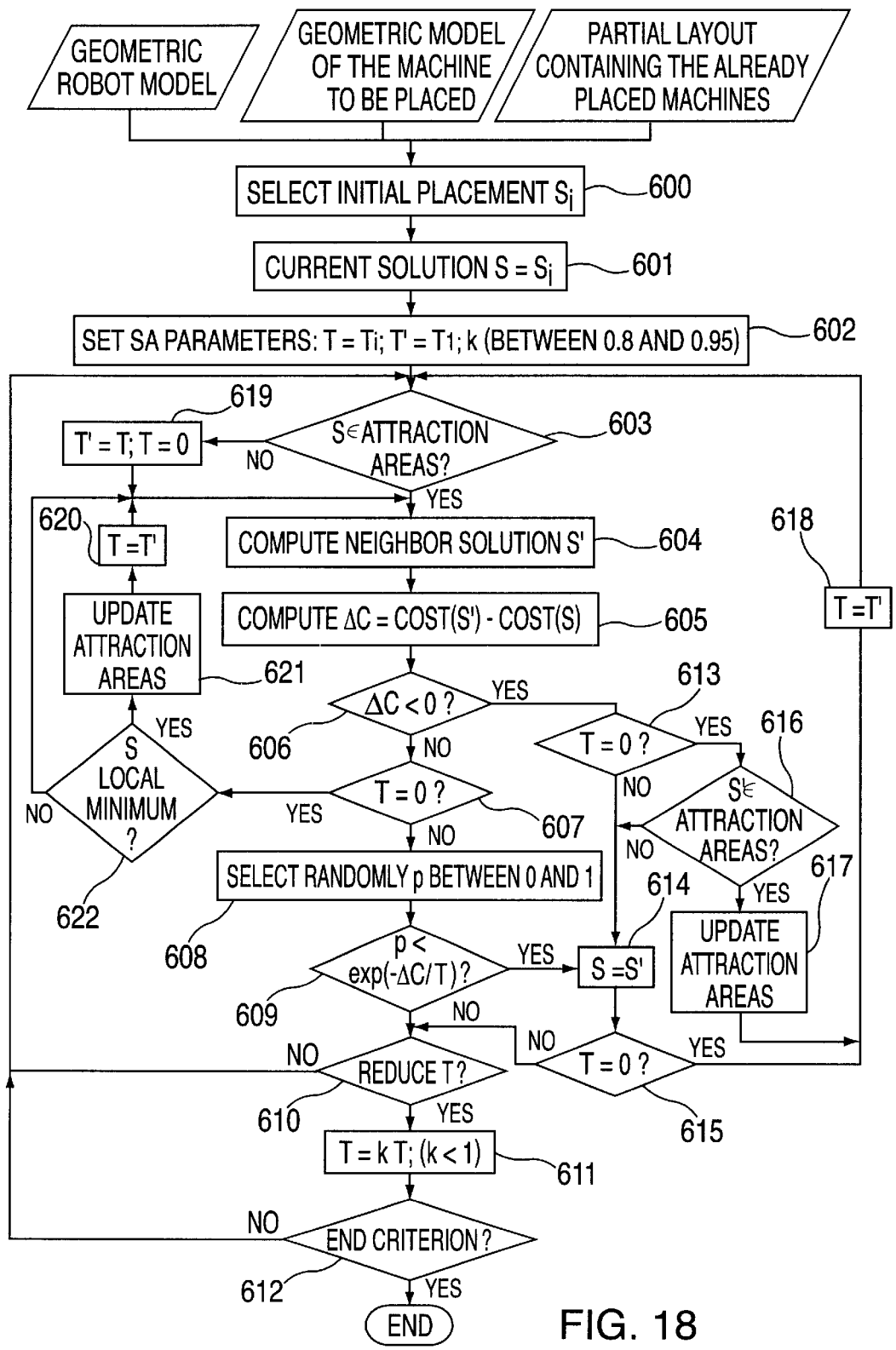
FIG. 18 is a schematic representation of the modified simulated annealing method, according to the present invention.

Referring to FIG. 18, the method of the modified simulated annealing algorithm of the present innovation is depicted. Thus, a starting peripheral machine placement is selected from the workspace (step 600), that location is set as the current solution (step 601), and the temperature function is initialized (step 602). It is then determined whether the current solution is within an attraction area (step 603). If so, then standard simulated annealing is applied to find the global optimum within the area. Referring to FIG. 18, this would involve steps 604 to 615, where the answer to the query "T=0" called for in steps 607, 613, and 615 is answered in the negative. In this case the temperature is reduced in accordance with the temperature reduction function.

If, however, the current solution is not within an attraction area, then the freeze-heat cycle is applied by setting the value for T to zero (step 619), resulting in a descent algorithm which works quickly towards a minimum without the possibility of jumping out of a local minimum, or going "uphill". In the event that the solution being evaluated is not in an attraction area, then one of two results occur. If, during the descent algorithm, the solution descends into the area of an existing attraction area, then the existing attraction area is updated so as to include the solution from which the descent algorithm originated, in which case the size of that attraction area is increased, as shown in FIG. 17. This is shown in FIG. 18 in step 616. In that step a solution that is better than the initial solution, as determined in step 606, arrives at step 616, since the query in step 613 is answered in the affirmative (T=0). At step 616 it is determined that the new solution is within an existing attraction area, and the attraction area is then updated (step 617) to include the solution from which the descent originated, resulting in an expanded attraction area.

On the other hand if, during the descent algorithm, the solution descends to a minimum without having fallen into an existing attraction area, then it is determined that a local minimum has been found at the center of a new attraction area. In this case the corresponding attraction area is created and stored (FIG. 18, steps 621 and 622).

The Cost Function

Through the foregoing modifications to the simulated annealing method, a method of finding optimum and near-optimum solutions which does not require an overwhelming amount of CPU time is obtained.

Modified simulated annealing is used to find a set of possible placements for the selected machine. The positions calculated are local minima of the cost function, in a search space limited only by the constraints mentioned in the section describing assumptions.

The cost function is calculated from equation (9) defined below:

$$F_i = \sum_{j=1}^{n} t_{ij} \times I_{ij} \quad (9)$$

where $t_{ij}$ is the time necessary for the robot to move from machine i to machine;

$I_{ij}$ is the number of interactions of machine i with the already placed machine j (i≠j); and n is the number of already placed machines.

Note that the value of $t_{ij}$ is obtained using standard functionality available in CAD/CAM/CAE systems.

Before evaluating $F_i$ for a given placement of the selected machine, the accessibility of the access point and the absence of overlapping are verified. The feasibility of the robot movements between the placed machines is also guaranteed: the standard functionality used to calculate move times returns an error message if a robot movement is impossible.

The initial machine position and orientation that are used as the initial solution by the modified simulated method is determined using the workcell floor representation described above. A sufficient number of empty matrix cells are selected, so that one of the boundaries of the machine to place coincides with an already placed machine. Even if such a location does not guarantee a good function value, it is privileged at the beginning to minimize the spaces between the machines.

Partial Layout Selection Rule

As discussed, at each step of the method of the "constructive algorithm" portion of the present invention, a machine is selected and the modified simulated annealing method is used to determine several possible placements of the selected machine. Hence, a layout constructed partially, that contains n already placed machines, yields a set of m layouts containing n+1 machines, where m corresponds to the number of possible locations for the machine to place.

Constructing the layouts for all the machine placements found would be computationally explosive. Therefore, a partial layout selection rule is necessary. This rule is an additional feature in comparison with standard constructive methods.

The scheme used is the following: among all the partial layouts generated after a construction step, keep the k best ones. The most efficient value for k proved experimentally to be five. It yielded the best "cycle time/CPU time" ratio.

At the end of execution, five optimal workcell layouts are thus provided to the user. Such a result is useful for several reasons. For example, the geometric modeling of the workcell does not represent the real world with enough accuracy. If we suppose that a placement obtained from the modified simulated annealing method is surrounded with positions that yield performance debasement and that this machine placement appears in one of the final optimal layouts, it will be impossible to transfer the result to the real site.

Example

Figure 19:
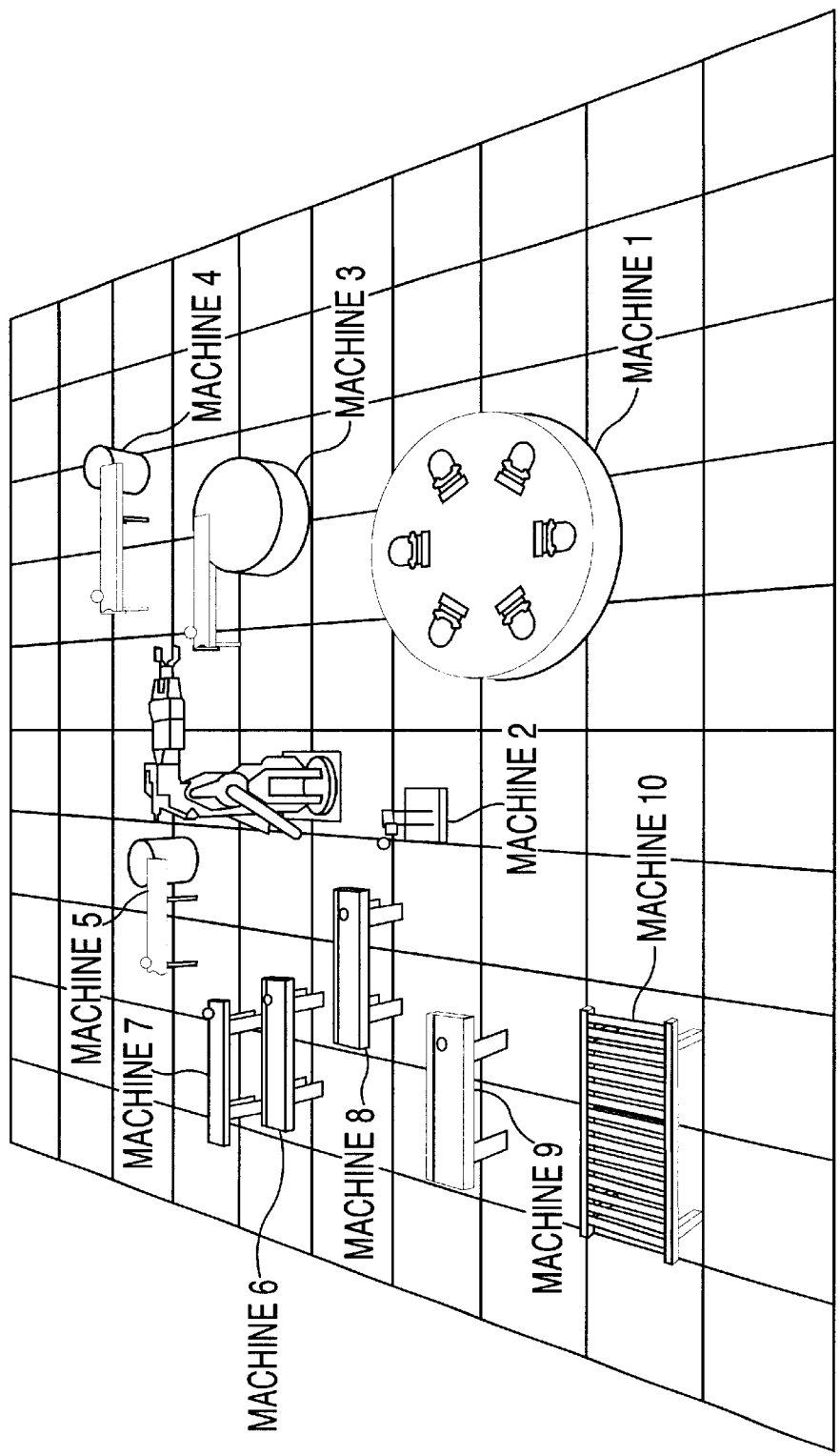
FIG. 19 is a graphic depiction of the workcell layout of the example presented herein, prior to optimization.

An example of the application of the method of the invention is now described with respect to a workcell employing one robot and ten machines. A pre-optimization three-dimensional representation is shown FIG. 19.

The operation sequence of the example is as follows:

1. The robot grasps drive shafts 6 times in succession from machine 6 and places them in the 6 assembly fixtures on the circular index table (machine 1).
2. A combination of bearings and thrust washers is obtained from machine 7 and fitted onto the fixture at machine 1, 6 times in succession.
3. The robot then grasps the grease-metering unit, machine 2, and applies grease to all the housing inner teeth of the 6 fixtures at machine 1.
4. A stepped shaft is grasped 6 times at machine 8 and fitted to the housing at machine 1.
5. 3 cylindrical pins are grasped in sequence at machine 4 and fitted into the stepped shaft at machine 1. This procedure is repeated 6 times in sequence.
6. 3 gear wheels are grasped 6 times in succession from machine 3 and placed onto the pins.
7. A fan wheel is gripped 6 times at machine 9 and fitted to the drive shaft at machine 1.
8. A spring nut obtained from machine 5 is fitted to each drive shaft at machine 1.
9. The finally assembled unit is removed from the index table and placed on the conveyor belt (machine 10) one at a time.

FIGS. 20 and 21 show the size and the rank tables generated from the above operation sequence, respectively.

From the previous tables, the values of $C_i$ (see equation (5)) could be calculated at each step of the program. The order in which the machines were placed is as follows:
mac.1-mac.7-mac.4-mac.5-mac.9-mac.6-mac.8-mac.3-mac.10-mac.2

Result Comparison

Figure 22:
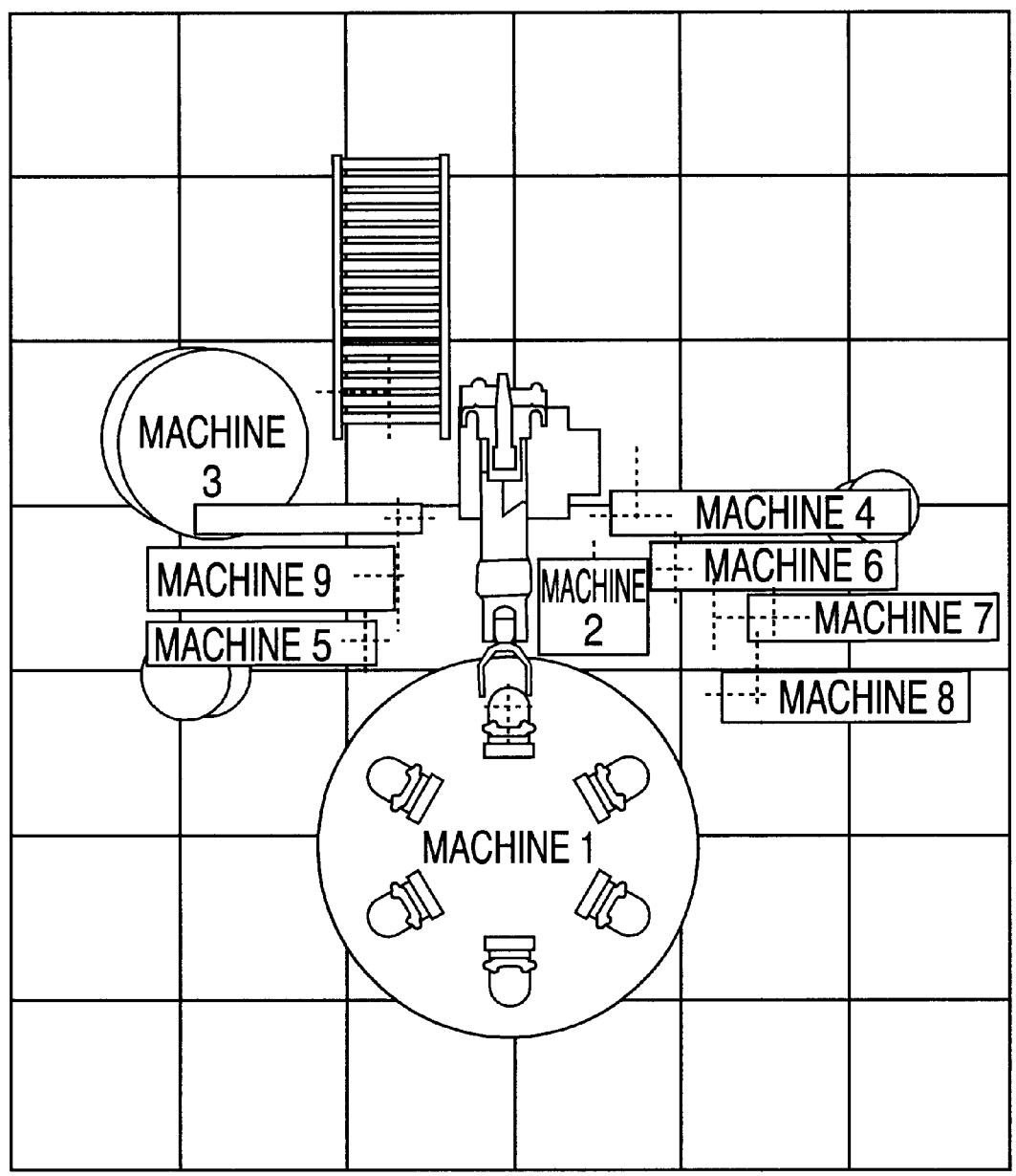
FIG. 22 is a graphic depiction of the optimal workcell layout generated by the preferred embodiment of the invention, for the example presented herein.
Figure 23:
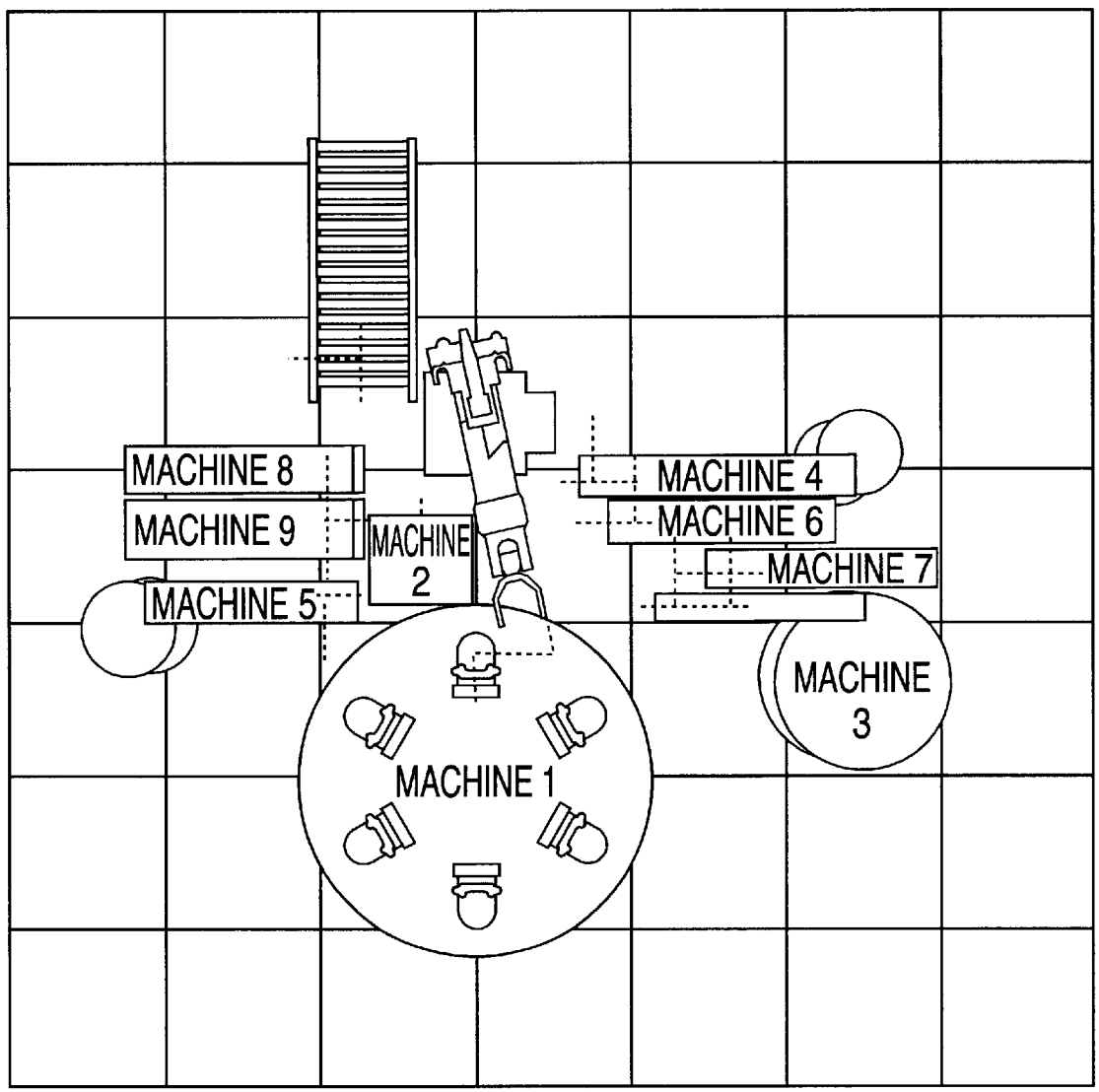
FIG. 23 is a graphic depiction of another workcell layout generated by the preferred embodiment of the invention, for the example presented herein.

The modified simulated annealing method of the present invention is a stochastic method. Hence, results of the method may vary from execution to execution. Both layouts presented in this section were obtained from a single application, in order to illustrate the results. FIG. 22 shows the optimal layout, whereas FIG. 23 presents another of the five solutions calculated, which is nearly optimal. Note that there are spaces between the machines for both layouts.

In order to make a comparison with a prior method, the method proposed by Tay and Ngoi in M. L. Tay and B. K. A. Ngoi, "Optimising Robot Workcell Layout", *The International Journal of Advanced Manufacturing Technology*, 12(5), pp. 377–385, 1996 was modified and implemented in "IGRIP", a commercially available CAD program sold by Dassault-Systémes, of Suresnes, France, so that comparison was possible. The robot used is an ACMA X58, been built by Renault Automation, rue Jules Guesdes, 91130 Ris-Orangis, France, instead of a Cartesian robot. The layout obtained, which was termed "T&N layout", is shown in FIG. 24.

Figure 24:
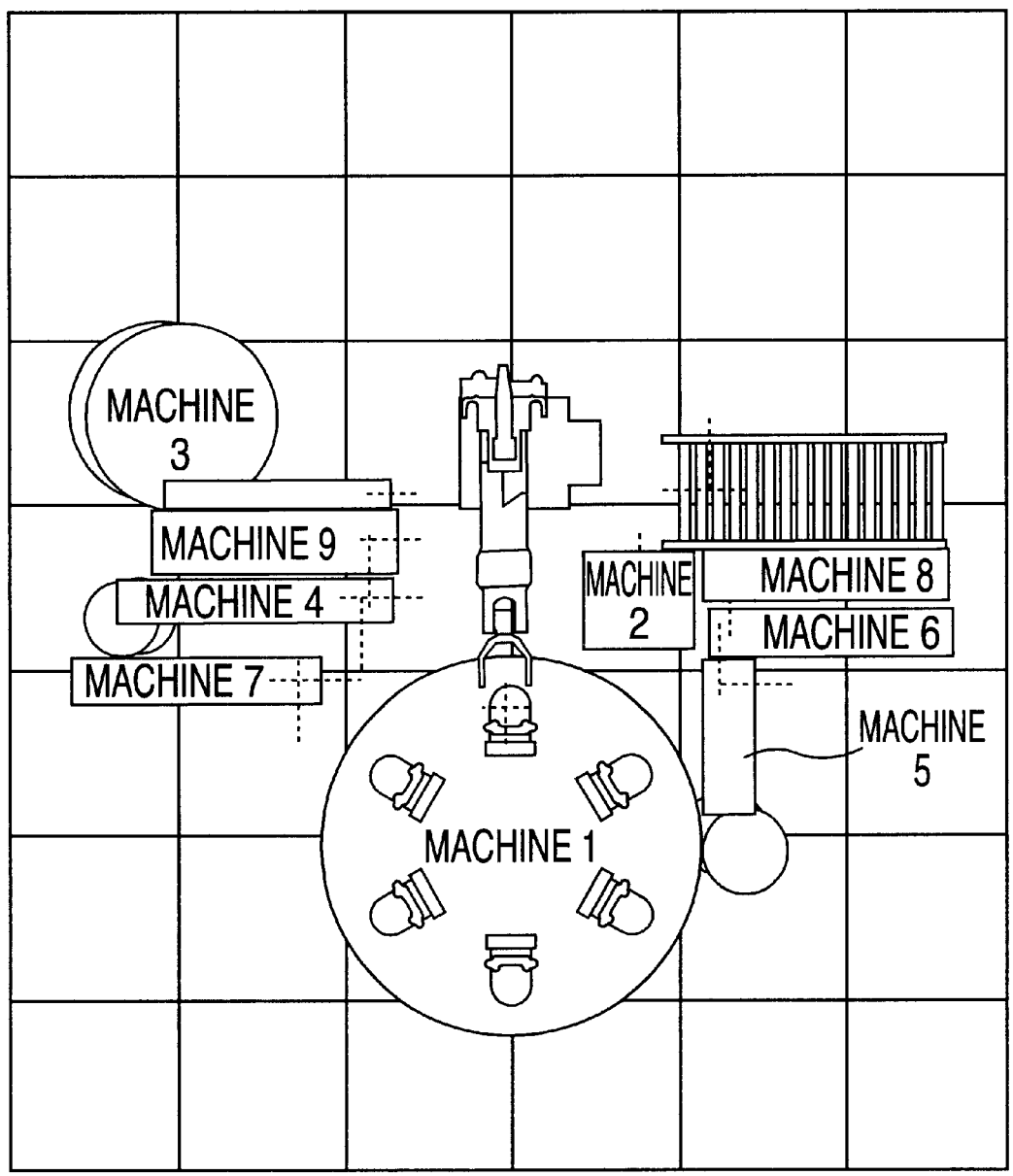
FIG. 24 is a graphic depiction of a workcell layout generated by a prior art method, for the example presented herein.

Table 1 gives the cycle times for the layouts shown in FIGS. 22, 23 and 24. Table 2 indicates the computation times necessary to both methods for optimizing the workcell layout.

TABLE 1

| | Cycle times | | |
|---|---|---|---|
| | Optimal layout (FIG. 22) | Near-optimal layout (FIG. 23) | T & N layout (FIG. 24) |
| Cycle time | 216.7 | 219.25 | 241.35 |

TABLE 2

| | Computation times | |
|---|---|---|
| | Present invention | T & N method |
| CPU time | 282.6 | 55.8 |

Accordingly, the optimal layout results in a reduction in the cycle time of 24.65 seconds compared to the prior art T&N layout, which is an improvement of 10.2%. Moreover, the near-optimal layout may be a very good solution in the event of additional constraints not considered in this study.

The computation time corresponding to the method of the present invention is longer than the computation time of T&N's method. Nevertheless, (1) the present method is compatible in the context of an industrial CAD/CAM/CAE system, (2) several layouts are obtained, and (3) the research space associated with the problem, i.e. the research space containing all the possible layouts, is searched widely, unlike the T&N method.

Statistical Results

As mentioned previously, the method is stochastic. Hence, statistical results are essential to study its performance. The program was executed 50 times in succession. Table 3 gives means and standard deviations of the cycle times. "Optimal layout" means in fact "Best layout among the, five obtained", and "Worst near-optimal layout" means, "Worst layout among the five obtained". Table 4 corresponds to computation time.

TABLE 3

| | Cycle times | |
|---|---|---|
| | Mean | Standard deviation |
| Optimal layout | 214.22 | 2.64 |
| Worst near-optimal layout | 216.31 | 1.89 |

TABLE 4

| Computation time | |
|---|---|
| Mean | Standard deviation |
| 276.23 | 8.72 |

Accordingly, the results obtained in the previous section are confirmed. Note that the method of the present invention yields on the average an improvement of 11.2% compared to the T&N method and that the best layout ever obtained resulted in a cycle time of 209.65 seconds.

It is to be understood that the foregoing method can be applied to any workplace configuration capable of being defined by the CAD/CAM system. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A method for operating a computer system for optimizing the placement of a robot and a set of peripheral machines in a workcell so as to minimize the cycle time for completion of a given operation sequence, the method comprising:

a) defining a data set representing the workcell;
   b) placing the robot and a first peripheral machine from said set of peripheral machines in said workcell, and designating said placement as a current layout set;

c) selecting another peripheral machine from said set of peripheral machines for placement in said workcell;
d) for each layout in said current layout set, calculating a set of possible locations for placement of the peripheral machine selected in step c) in said workcell using an optimization method selective for minimum cycle time, said optimization method selective for minimum cycle time comprising a conventional simulated annealing method that has been modified, said modifications comprising:
   i) storing local minima as they are encountered during the simulated annealing process;
   ii) establishing attraction areas corresponding to each of said local minima comprising areas surrounding a local minimum data point;
   iii) performing a gradient descent, by setting a temperature function of the simulated annealing method to a value of zero, when a data point is encountered that is not within ah attraction area; and
   iv) redefining an attraction area when a gradient descent generates data points falling within an attraction area so that the attraction area includes the data point from which the gradient descent began;
e) selecting from the set of possible locations calculated in step d) a subset of locations that represent the locations corresponding to the lowest calculated cycle times, wherein each selected location corresponds to a layout of objects in the workcell, and designating said subset of layouts as the current layout set; and
f) repeating steps c) to e) until all of said peripheral machines in said set of peripheral machines has been placed in said workcell.

2. The method of claim 1, further comprising the step of placing the peripheral machines in said set of peripheral machines in an order for placement in the workcell.

3. The method of claim 2, wherein said peripheral machines are placed in an order favoring machines that are accessed the most by the robot.

4. The method of claim 2, wherein said peripheral machines are placed in an order favoring smaller machines over larger machines.

5. The method of claim 2, wherein said peripheral machines are placed in an order favoring machines that are accessed the most by the robot as one criterion, and favoring smaller machines over larger machines as a second criterion.

6. A CAD/CAM computer system comprising:
   an input device;
   a central processing unit; and
   a memory device for storing data;
   wherein the central processing unit is programmed to run an application program comprising code for optimizing the placement of a robot and a set of peripheral machines in a workcell so as to minimize the cycle time for completion of a given operation sequence, said code causing the system to execute a method comprising:
   a) defining a data set representing the workcell;
   b) placing the robot and a first peripheral machine from said set of peripheral machines in said workcell, and designating said placement as a current layout set;
   c) selecting another peripheral machine from said set of peripheral machines for placement in said workcell;
   d) for each layout in said current layout set, calculating a set of possible locations for placement of the peripheral machine selected in step c) in said workcell using an optimization method selective for minimum cycle time comprising a simulated annealing method that has been modified, said modifications comprising:
      i) storing local minima as they are encountered during the simulated annealing process;
      ii) storing attraction areas corresponding to each of said local minima, comprising areas surrounding a local minimum data point; and
      iii) performing a gradient descent, by setting a temperature function of the simulated annealing method to a value of zero, when a data point is encountered that is not within an attraction area; and
      iv) redefining and storing an attraction area when a gradient descent generates data points falling within an attraction area so that the attraction area includes the data point from which the gradient descent began;
   e) selecting from the set of possible locations calculated in step d) a subset of locations that represent the locations corresponding to the lowest calculated cycle times, wherein each selected location corresponds to a layout of objects in the workcell, and designating said subset of layouts as the current layout set; and
   f) repeating steps c) to e) until all of said peripheral machines in said set of peripheral machines has been placed in said workcell.

7. The CAD/CAM computer system of claim 6, wherein said method further comprises the step of placing the peripheral machines in said set of peripheral machines in an order for placement in the workcell.

8. The CAD/CAM computer system of claim 7, wherein said peripheral machines are placed in an order favoring machines that are accessed the most by the robot.

9. The CAD/CAM computer system of claim 7, wherein said peripheral machines are placed in an order favoring smaller machines over larger machines.

10. Computer executable code stored on a computer readable medium, the code comprising means for causing a computer to optimize the placement of a robot and a set of peripheral machines in a workcell so as to minimize the cycle time for completion of a given operation sequence, said code further comprising means for causing a computer to execute the method comprising:
   a) defining a data set representing the workcell;
   b) placing the robot and a first peripheral machine from said set of peripheral machines in said workcell, and designating said placement as a current layout set;
   c) selecting another peripheral machine from said set of peripheral machines for placement in said workcell;
   d) for each layout in said current layout set, calculating a set of possible locations for placement of the peripheral machine selected in step c) in said workcell using an optimization method selective for minimum cycle time comprising a simulated annealing method that has been modified, said modifications comprising:
      i) storing local minima as they are encountered during the simulated annealing process;
      ii) storing attraction areas corresponding to each of said local minima, comprising areas surrounding a local minimum data point; and
      iii) performing a gradient descent, by setting a temperature function of the simulated annealing method to a value of zero, when a data point is encountered that is not within an attraction area; and
      iv) redefining and storing an attraction area when a gradient descent generates data points falling within an attraction area so that the attraction area includes the data point from which the gradient descent began;
   e) selecting from the set of possible locations calculated in step d) a subset of locations that represent the locations corresponding to the lowest calculated cycle times, wherein each selected location corresponds to a layout of objects in the workcell, and designating said subset of layouts as the current layout set; and f) repeating steps c) to e) until all of said peripheral machines in said set of peripheral machines has been placed in said workcell.

11. The computer executable code stored on a computer readable medium of claim 10, said code further comprising means for causing a computer to take steps comprising:

placing the peripheral machines in said set of peripheral machines in an order for placement in the workcell.

12. The computer executable code stored on a computer readable medium of claim 11, said code further comprising means for causing a computer to take the step comprising placing said peripheral machines in an order favoring machines that are accessed the most by the robot.

13. The computer executable code stored on a computer readable medium of claim 11, said code further comprising means for causing a computer to take the step comprising placing said peripheral machines in an order favoring smaller machines over larger machines.

* * * * *